(12) United States Patent
Watanabe et al.

(10) Patent No.: US 10,189,931 B2
(45) Date of Patent: Jan. 29, 2019

(54) GRAFT POLYMER AND METHOD FOR PRODUCING SAME

(71) Applicant: NITTO BOSEKI CO., LTD., Fukushima-shi (JP)

(72) Inventors: Koji Watanabe, Koriyama (JP); Masaru Bunya, Koriyama (JP)

(73) Assignee: NITTO BOSEKI CO., LTD., Fukushima-shi (JP)

( * ) Notice: Subject to any disclaimer, the term of this patent is extended or adjusted under 35 U.S.C. 154(b) by 84 days.

(21) Appl. No.: 15/120,799

(22) PCT Filed: Feb. 27, 2015

(86) PCT No.: PCT/JP2015/055891
§ 371 (c)(1),
(2) Date: Aug. 23, 2016

(87) PCT Pub. No.: WO2015/146486
PCT Pub. Date: Oct. 1, 2015

(65) Prior Publication Data
US 2017/0008991 A1   Jan. 12, 2017

(30) Foreign Application Priority Data
Mar. 24, 2014 (JP) ................... 2014-060419

(51) Int. Cl.
*C08F 283/00* (2006.01)
*C08F 291/12* (2006.01)
*C08F 271/00* (2006.01)

(52) U.S. Cl.
CPC .......... *C08F 271/00* (2013.01); *C08F 283/00* (2013.01); *C08F 291/12* (2013.01)

(58) Field of Classification Search
CPC .... C08F 291/12; C08F 261/00; C08F 269/00; C08F 271/00; C08F 291/06
See application file for complete search history.

(56) References Cited

U.S. PATENT DOCUMENTS

| | | | |
|---|---|---|---|
| 4,177,124 A * | 12/1979 | Hazan | C08G 81/025 204/501 |
| 5,100,969 A | 3/1992 | Yamamoto et al. | |
| 5,187,229 A | 2/1993 | Yamamoto et al. | |
| 6,395,849 B1 | 5/2002 | Kato et al. | |
| 7,547,747 B2 | 6/2009 | Hashimoto | |
| 2005/0124765 A1 | 6/2005 | Seko et al. | |
| 2008/0194449 A1 | 8/2008 | Becker | |
| 2008/0318063 A1 * | 12/2008 | Anderson | B32B 17/10 428/430 |
| 2010/0029544 A1 | 2/2010 | Cheng et al. | |
| 2012/0322264 A1 * | 12/2012 | Raman | C09G 1/02 438/692 |
| 2015/0010848 A1 | 1/2015 | Suzuki | |
| 2016/0367979 A1 | 12/2016 | Ashizawa | |

FOREIGN PATENT DOCUMENTS

| | | |
|---|---|---|
| JP | 49-029886 A | 8/1974 |
| JP | H02-311502 A | 12/1990 |
| JP | 03-103478 A | 4/1991 |
| JP | 2004-089787 A | 3/2004 |
| JP | 2004-225181 A | 8/2004 |
| JP | 2005-097636 A | 4/2005 |
| JP | 2005-154973 A | 6/2005 |
| JP | 2006-036830 A | 2/2006 |
| JP | 2008-528745 A | 7/2008 |
| JP | 2009-516012 A | 4/2009 |
| JP | 2012-030222 A | 2/2012 |
| WO | 2007-054468 | 5/2007 |
| WO | 2008107326 A1 | 9/2008 |
| WO | 2013136762 A1 | 9/2013 |
| WO | 2015/146487 A1 | 10/2015 |

OTHER PUBLICATIONS

U.S. Appl. No. 15/120,820, filed Aug. 23, 2016.
PCT/JP2015/055891: International Search Report & Written Opinion dated Jun. 2, 2015.
Ashizawa et al., "Investigation of preparation method of direct detection for the purpose of bacterial identification with mass spectrometer", The Japan Society for Clinical Laboratory Automation (Abstract), date of disclosure: Sep. 1, 2014, 2 pages.
Noda et al., "A novel preparation kit; rapid BACpro®, for bacterial identification with matrix-assisted laser desorption ionization time-of-flight mass spectrometry", Japanese Society for Biomedical Mass Spectrometry (Abstract), date of disclosure: Sep. 1, 2014, 2 pages.
Ashizawa et al., "Development of a rapid microbial preparation system from a blood culture bottle using cationic particles for bacterial identification with matrix-assisted laser desorption ionization time-of-flight mass spectrometry", Human Proteome Organization (Abstract), date of disclosure: Oct. 4, 2014, 2 pages.
Chinese Search Report for Chinese Application No. 2015800159805 dated Feb. 1, 2018 (2 Sheets).

(Continued)

*Primary Examiner* — Jeffrey C Mullis
(74) *Attorney, Agent, or Firm* — Kratz, Quintos & Hanson, LLP

(57) ABSTRACT

Provided are: a graft copolymer which can be safely and stably produced with simple operation, while maintaining the characteristics of an amine, and which is lower in the introduction cost than conventional graft copolymers; and a method for producing the graft copolymer.
A polyamine graft polymer that is obtained by polymerizing a polyamine derivative, which is obtained by reacting a polymer compound (a) having at least one amino group with a compound (b) having at least one epoxy group, with an ethylenically unsaturated monomer (c). A method for producing a polyamine graft polymer, which comprises a step for adding, for polymerization, an ethylenically unsaturated monomer (c) and a radical polymerization initiator to a polyamine derivative, which is obtained by reacting a polymer compound (a) having at least one amino group with a compound (b) having at least one epoxy group, in a polar solvent.

18 Claims, 19 Drawing Sheets

(56) References Cited

OTHER PUBLICATIONS

Chinese Office Action for corresponding Chinese Patent Application No. 201580015980.5 dated Feb. 1, 2018 (9 Sheets).
Extended European Search Report for counterpart EPC Patent Application No. 15769422.5 dated Feb. 23, 2018 (11 Sheets).
Nittobo Medical Co. Ltd., ed.,"The 15th Technical Seminar on Genetics and Proteomics," 46th General Meeting of the Japanese Society of Clinical Laboratory Automation, Oct. 9, 2014, disclosed in Japanese Journal of Clinical Automation, 39 (214), Sep. 1, 2014.
Japanese Office Action in corresponding Japanese Application No. 2016-510173, dated Sep. 5, 2018.

* cited by examiner

RETENTION TIME [MINUTE]

RETENTION TIME [MINUTE]

RETENTION TIME [MINUTE]

GRAFT POLYMER AND METHOD FOR PRODUCING SAME

TECHNICAL FIELD

The present invention relates to a graft polymer which can be safely and stably produced with low introduction cost and a simple operation, and a method for producing the same.

BACKGROUND ART

As a suitable means for imparting a desired property to a polymer or a polymer compound, graft polymerization for grafting a side chain having a functional group on a polymer main chain, and a graft polymer obtained thereby are widely used.

Examples of a known method for producing a graft polymer having an allylamine polymer as a main chain include a method by chemical modification and a method using a radiation.

Examples of the known method by chemical modification include a method for modifying a polymer having a functional group to react with an amino group (for example, an aldehyde group, a carboxyl group, an acid halide group, an isocyanate group, an epoxy group, or an acryloyl group) at a terminal of the polymer as a graft chain (for example, refer to Patent Literatures 1 and 2), a method for modifying a compound having a radically polymerizable functional group and a functional group to react with an amino group in a polymer main chain and subsequently performing polymerization (for example, refer to Patent Literature 3), and a method for polymerizing a compound having a radically polymerizable functional group and a functional group to react with an amino group at a terminal of a polymer as a graft chain and subsequently performing a reaction of a polymer having an amino group (for example, refer to Patent Literature 4).

Examples of the known method using a radiation include a method for causing a polymer main chain to induce a radical to be used as a polymerization initiation point by irradiating a substrate (for example, polyolefin or cellulose) with an electronic beam and polymerizing a monomer as a graft chain (for example, refer to Patent Literature 5).

A graft polymer including an allylamine polymer is known. Meanwhile, a derivative obtained by a reaction between an allylamine polymer and an epoxy compound is also known, but a graft polymer of the derivative is not known.

CITATION LIST

Patent Literature

PATENT LITERATURE 1: JP 2004-89787 A
PATENT LITERATURE 2: US 2010-0029544 A
PATENT LITERATURE 3: JP 2006-36830 A
PATENT LITERATURE 4: JP 2004-225181 A
PATENT LITERATURE 5: JP 2005-154973 A

SUMMARY OF INVENTION

Technical Problem

However, in a reactive functional group such as aldehyde or an acid halide, there is a concern about potential toxicity due to high reactivity thereof. It is difficult to handle the reactive functional group as a raw material because the reactive functional group is hydrolyzed easily. A reaction with a carboxyl group needs a high temperature of 130° C. or higher due to a dehydration reaction. Furthermore, in this method, it is necessary to produce a trunk polymer and a polymer as a graft chain separately, and cost thereof is high. In addition, a reaction with an amino group causes conversion of a functional group. Therefore, a higher introduction ratio of the graft chain makes the amino group less. Therefore, a problem remains, for example, characteristics of an amine required as an allylamine polymer are lost.

The method using a radiation does not require such a high temperature as described above, but one-pot production is possible. However, installation cost is high, for example, a radiation irradiation device is very expensive, and it is necessary to use a device for handling a radiation. Furthermore, a radiation requires a high energy, and therefore cost thereof is high. In addition, in an electron beam such as a radiation, there is a concern about an influence on the human body, and a problem of ensuring safety in production remains.

The present inventors made intensive studies in order to solve the above problems remaining in prior art. As a result, the present inventors have found a graft polymerization method capable of safe and stable production with lower introduction cost than prior art and a simpler operation, and a graft polymer obtained thereby, and have reached the present invention. The present invention is particularly suitably applied to graft polymerization of an allylamine polymer.

Solution to Problem

That is, a first invention of the present application relates to

[1] a polyamine graft polymer obtained by polymerizing a polyamine derivative obtained by a reaction between (a) a polymer compound having at least one amino group and (b) a compound having at least one epoxy group; and (c) an ethylenically unsaturated monomer.

The following [2] is a preferable embodiment of the present invention.

[2] The polyamine graft polymer according to the above [1], wherein the polymer compound having at least one amino group (a) is selected from the group consisting of an ethyleneimine (co)polymer having a structure represented by general formula (1), a vinylamine (co)polymer having a structure represented by general formula (2), an allylamine (co)polymer having a structure represented by general formula (3), a diallylamine (co)polymer having a structure represented by general formula (4), and an acrylic amine (co)polymer having a structure represented by general formula (5) (in the following general formulae, n is an integer of from 10 to 200000, m is an integer of from 5 to 18000, 1 is an integer of from 5 to 15000, o is an integer of from 10 to 10000, and p is an integer of from 1 to 100).

[FORMULA 1]

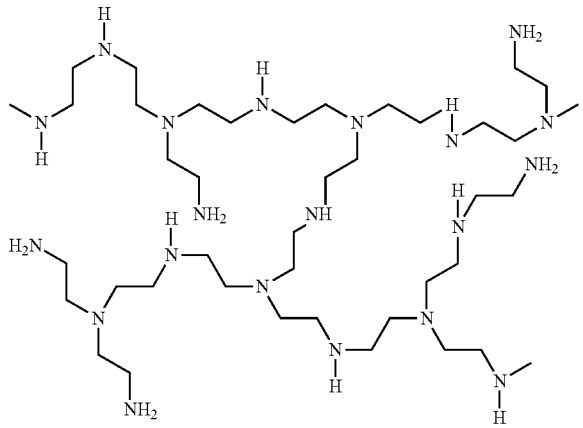

(1)

[FORMULA 2]

$$-\left[\text{CH}_2-\text{CH}\atop|\atop\text{NH}_2\right]_n$$ (2)

[FORMULA 3]

$$-\left[\text{CH}_2-\text{CH}\atop|\atop\text{CH}_2\atop|\atop\text{NH}_2\right]_m$$ (3)

[FORMULA 4]

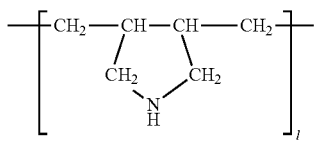

(4)

[FORMULA 5]

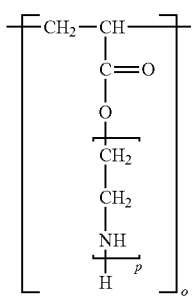

(5)

A second invention of the present application relates to

[3] a polyamine graft polymer obtained by polymerizing a polyamine derivative obtained by polymerizing a modified allylamine monomer obtained by a reaction between (a') an allylamine monomer having at least one allyl group and at least one amino group and (b) a compound having at least one epoxy group; and (c) an ethylenically unsaturated monomer. The following [4] to [7] are preferable embodiments of the present invention.

[4] The polyamine graft polymer according to the above [3], wherein the allylamine monomer (a') is diallylamine.

[5] The polyamine graft polymer according to any one of the above [1] to [4], wherein the compound having at least one epoxy group (b) is a compound represented by general formula (6) (R in general formula (6) is a substituted or unsubstituted hydrocarbon group).

[FORMULA 6]

(6)

[6] The polyamine graft polymer according to any one of the above [1] to [4], wherein the compound having at least one epoxy group (b) is a compound represented by general formula (7) and selected from the group consisting of (1) ethylene oxide in which $R_1$, $R_2$, $R_3$, and $R_4$ in the formula are each a hydrogen atom, (2) an epoxy compound in which $R_1$, $R_2$, $R_3$, and $R_4$ in the formula are each independently a hydrogen atom or a linear or branched saturated hydrocarbon group having a hydroxy group in the chain and having 1 to 8 carbon atoms (not all of $R_1$, $R_2$, $R_3$, and $R_4$ are hydrogen atoms), (3) an epoxy compound in which $R_1$, $R_2$, $R_3$, and $R_4$ in the formula are each independently a hydrogen atom or a linear or branched alkyl group having 1 to 18 carbon atoms (not all of $R_1$, $R_2$, $R_3$, and $R_4$ are hydrogen atoms), (4) an epoxy compound in which $R_1$, $R_2$, $R_3$, and $R_4$ in the formula are each independently a hydrogen atom or a linear or branched saturated hydrocarbon group having an ether bond in the chain and having 1 to 8 carbon atoms (not all of $R_1$, $R_2$, $R_3$, and $R_4$ are hydrogen atoms), (5) an epoxy compound in which $R_1$, $R_2$, $R_3$, and $R_4$ in the formula are each independently a hydrogen atom or a halogen atom (not all of $R_1$, $R_2$, $R_3$, and $R_4$ are hydrogen atoms), (6) an epoxy compound in which $R_1$, $R_2$, $R_3$, and $R_4$ in the formula are each independently a hydrogen atom or an unsaturated hydrocarbon group (not all of $R_1$, $R_2$, $R_3$, and $R_4$ are hydrogen atoms), (7) an epoxy compound in which $R_1$, $R_2$, $R_3$, and $R_4$ in the formula are each independently a hydrogen atom or a hydrocarbon group containing an alicyclic hydrocarbon group or a cyclic hydrocarbon group having an unsaturated bond (not all of $R_1$, $R_2$, $R_3$, and $R_4$ are hydrogen atoms), (8) an epoxy compound in which $R_1$, $R_2$, $R_3$, and $R_4$ in the formula are each independently a hydrogen atom or a hydrocarbon group containing an aromatic ring or a heterocyclic ring (not all of $R_1$, $R_2$, $R_3$, and $R_4$ are hydrogen atoms), (9) a polyfunctional epoxy compound in which $R_1$, $R_2$, $R_3$, and $R_4$ in the formula are each independently a hydrogen atom or a hydrocarbon group containing an epoxy ring (not all of $R_1$, $R_2$, $R_3$, and $R_4$ are hydrogen atoms), (10) an epoxy compound in which $R_1$, $R_2$, $R_3$, and $R_4$ in the formula are each independently a hydrogen atom or a linear or branched saturated hydrocarbon group containing an alkoxysilyl in the chain and having 3 to 12 carbon atoms (not all of $R_1$, $R_2$, $R_3$, and $R_4$ are hydrogen atoms), (11) an epoxy compound in which $R_1$, $R_2$, $R_3$, and $R_4$ in the formula are each independently a hydrogen atom or a hydrocarbon group containing a fluorine atom in the chain (not all of $R_1$, $R_2$, $R_3$, and $R_4$ are hydrogen atoms), (12) an epoxy compound in which $R_1$, $R_2$, $R_3$, and $R_4$ in the formula are each independently a hydrogen atom or a hydrocarbon group containing a carboxyl group in the chain (not all of $R_1$, $R_2$, $R_3$, and $R_4$ are hydrogen atoms), (13) an epoxy compound in which $R_1$, $R_2$, $R_3$, and $R_4$ in the formula are each independently a hydrogen atom or a linear or branched saturated hydrocarbon group containing an ester bond or an amide bond in the chain and having 1 to 12 carbon atoms (not all of $R_1$, $R_2$, $R_3$, and $R_4$ are hydrogen atoms), and (14) an epoxy compound in which $R_1$, $R_2$, $R_3$, and $R_4$ in the formula are each independently a hydrogen atom or a hydrocarbon group containing a sulfonate group in the chain (not all of $R_1$, $R_2$, $R_3$, and $R_4$ are hydrogen atoms).

[FORMULA 7]

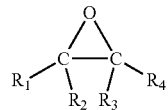

-(7)

[7] The polyamine graft polymer according to any one of the above [1] to [6], wherein the ethylenically unsaturated monomer (c) is selected from the group consisting of a vinyl monomer, a styrene monomer, a methacrylate monomer, an acrylate monomer, an acrylamide monomer, an allyl monomer, a diallyl monomer, and an unsaturated carboxylic acid.

A third invention of the present application relates to

[8] a method for producing a polyamine graft polymer, comprising the step of adding (c) an ethylenically unsaturated monomer and a radical polymerization initiator to a polyamine derivative obtained by a reaction between (a) polymer compound having at least one amino group and (b) a compound having at least one epoxy group to polymerize in a polar solvent.

A fourth invention of the present application relates to

[9] a method for producing a polyamine graft polymer, comprising the step of adding (c) an ethylenically unsaturated monomer and a radical polymerization initiator to a polyamine derivative obtained by polymerizing a modified allylamine monomer obtained by a reaction between (a') an allylamine monomer having at least one allyl group and at least one amino group and (b) a compound having at least one epoxy group to polymerize in a polar solvent. The following [10] to [14] are preferable embodiments of the present invention.

[10] The method for producing a polyamine graft polymer according to the above [9], wherein the allylamine monomer (a') is diallylamine.

[11] The method for producing a polyamine graft polymer according to any one of the above [8] to [10], wherein the radical polymerization initiator is selected from the group consisting of an azo initiator represented by general formula (8), an organic peroxide initiator represented by general formula (9), and an inorganic persulfate initiator represented by general formula (10) (in the following general formulae, $R_5$ and $R_6$ are each independently an organic group having 1 to 20 carbon atoms, $R_7$ and $R_8$ are each independently a hydrogen atom or an organic group having 1 to 20 carbon atoms, and M is an alkali metal or ammonium).

[FORMULA 8]

-(8)

[FORMULA 9]

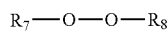

-(9)

[FORMULA 10]

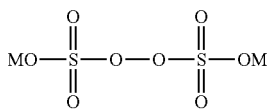

-(10)

[12] The method for producing a polyamine graft polymer according to any one of the above [8] to [11], wherein the polymerization step uses a polyamine derivative solution at a temperature of from 0 to 100° C.

[13] The method for producing a polyamine graft polymer according to any one of the above [8] to [12], wherein the polymerization step uses a polyamine derivative solution at a pH of 0 or more.

[14] The method for producing a polyamine graft polymer according to any one of the above [8] to [13], wherein the compound having at least one epoxy group (b) is a compound represented by general formula (7) and selected from the group consisting of (1) ethylene oxide in which each of $R_1$, $R_2$, $R_3$, and $R_4$ in the formula is a hydrogen atom, (2) an epoxy compound in which $R_1$, $R_2$, $R_3$, and $R_4$ in the formula are each independently a hydrogen atom or a linear or branched saturated hydrocarbon group having a hydroxy group in the chain and having 1 to 8 carbon atoms (not all of $R_1$, $R_2$, $R_3$, and $R_4$ are hydrogen atoms), (3) an epoxy compound in which $R_1$, $R_2$, $R_3$, and $R_4$ in the formula are each independently a hydrogen atom or a linear or branched alkyl group having 1 to 18 carbon atoms (not all of $R_1$, $R_2$, $R_3$, and $R_4$ are hydrogen atoms), (4) an epoxy compound in which $R_1$, $R_2$, $R_3$, and $R_4$ in the formula are each independently a hydrogen atom or a linear or branched saturated hydrocarbon group having an ether bond in the chain and having 1 to 8 carbon atoms (not all of $R_1$, $R_2$, $R_3$, and $R_4$ are hydrogen atoms), (5) an epoxy compound in which $R_1$, $R_2$, $R_3$, and $R_4$ in the formula are each independently a hydrogen atom or a halogen atom (not all of $R_1$, $R_2$, $R_3$, and $R_4$ are hydrogen atoms), (6) an epoxy compound in which $R_1$, $R_2$, $R_3$, and $R_4$ in the formula are each independently a hydrogen atom or an unsaturated hydrocarbon group (not all of $R_1$, $R_2$, $R_3$, and $R_4$ are hydrogen atoms), (7) an epoxy compound in which $R_1$, $R_2$, $R_3$, and $R_4$ in the formula are each independently a hydrogen atom or a hydrocarbon group containing an alicyclic hydrocarbon group or a cyclic hydrocarbon group having an unsaturated bond (not all of $R_1$, $R_2$, $R_3$, and $R_4$ are hydrogen atoms), (8) an epoxy compound in which $R_1$, $R_2$, $R_3$, and $R_4$ in the formula are each independently a hydrogen atom or a hydrocarbon group containing an aromatic ring or a heterocyclic ring (not all of $R_1$, $R_2$, $R_3$, and $R_4$ are hydrogen atoms), (9) a polyfunctional epoxy compound in which $R_1$, $R_2$, $R_3$, and $R_4$ in the formula are each independently a hydrogen atom or a hydrocarbon group containing an epoxy ring (not all of $R_1$, $R_2$, $R_3$, and $R_4$ are hydrogen atoms), (10) an epoxy compound in which $R_1$, $R_2$, $R_3$, and $R_4$ in the formula are each independently a hydrogen atom or a linear or branched saturated hydrocarbon group containing an alkoxysilyl in the chain and having 3 to 12 carbon atoms (not all of $R_1$, $R_2$, $R_3$, and $R_4$ are hydrogen atoms), (11) an epoxy compound in which $R_1$, $R_2$, $R_3$, and $R_4$ in the formula are each independently a hydrogen atom or hydrocarbon group containing a fluorine atom in the chain (not all of $R_1$, $R_2$, $R_3$, and $R_4$ are hydrogen atoms), (12) an epoxy compound in which $R_1$, $R_2$, $R_3$, and $R_4$ in the formula are each independently a hydrogen atom or a hydrocarbon group containing a carboxyl group in the chain (not all of $R_1$, $R_2$, $R_3$, and $R_4$ are hydrogen atoms), (13) an epoxy compound in which $R_1$, $R_2$, $R_3$, and $R_4$ in the formula are each independently a hydrogen atom or a linear or branched saturated hydrocarbon group containing an ester bond or an amide bond in the chain and having 1 to 12 carbon atoms (not all of $R_1$, $R_2$, $R_3$, and $R_4$ are hydrogen atoms), and (14) an epoxy compound in which $R_1$, $R_2$, $R_3$, and $R_4$ in the formula are each independently a hydrogen atom or a hydrocarbon group containing a sulfonate group in the chain (not all of $R_1$, $R_2$, $R_3$, and $R_4$ are hydrogen atoms).

[FORMULA 11]

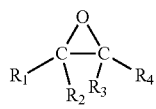

-(7)

Advantageous Effects of Invention

The first and third inventions of the present application can provide a graft copolymer which can be safely and stably produced with lower introduction cost than prior art and a simple operation while maintaining characteristics of an amine, and a method for producing the same. The first and third inventions of the present application can be used particularly preferably in an allylamine graft copolymer.

The second and fourth inventions of the present application can provide a graft copolymer which can be safely and stably produced by performing a reaction with lower introduction cost than prior art, a simple operation, an excellent efficiency, and excellent controllability while maintaining characteristics of an amine, and a method for producing the same.

DESCRIPTION OF EMBODIMENTS

Figure 1:
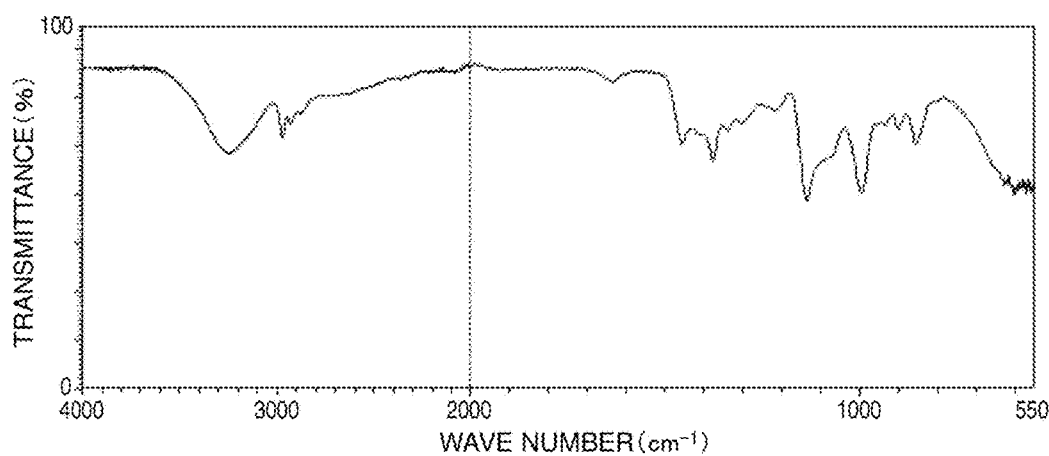
FIG. 1 illustrates an infrared spectrum of propylene oxide-modified polyallylamine in an example of the present invention.

A first invention of the present application is a polyamine graft polymer obtained by polymerizing a polyamine derivative obtained by a reaction between (a) a polymer compound having at least one amino group and (b) a compound having at least one epoxy group; and (c) an ethylenically unsaturated monomer.

[(a) Polymer Compound Having at Least One Amino Group]

As the polymer compound having at least one amino group (a) used in the first invention of the present application, any polymer compound having at least one amino group in a structure thereof can be used. However, it is preferable to use an ethyleneimine (co)polymer having a structure represented by general formula (1), a vinylamine (co)polymer having a structure represented by general formula (2), an allylamine (co)polymer having a structure represented by general formula (3), a diallylamine (co) polymer having a structure represented by general formula (4), or an acrylic amine (co)polymer having a structure represented by general formula (5). In the following general formulae, n is an integer of from 10 to 200000, m is an integer of from 5 to 18000, l is an integer of from 5 to 15000, o is an integer of from 10 to 10000, and p is an integer of from 1 to 100.

[FORMULA 12]

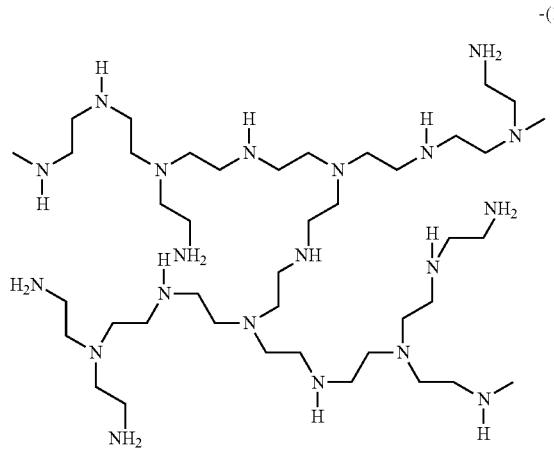
-(1)

[FORMULA 13]

-(2)

[FORMULA 14]

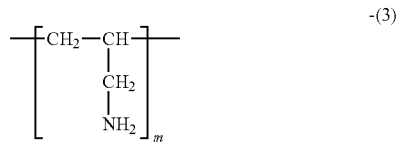
-(3)

[FORMULA 15]

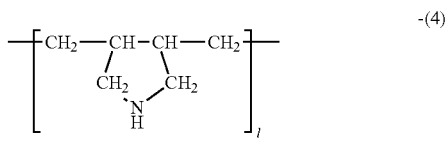
-(4)

[FORMULA 16]

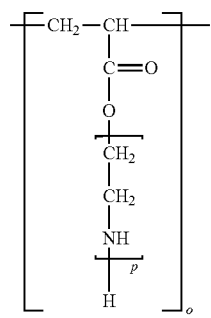
-(5)

As the polymer compound having at least one amino group (a) used in the first invention of the present application, an allylamine polymer represented by general formula (3) is particularly preferably used.

The allylamine polymer represented by general formula (3) has a property as an amine even after grafting, and therefore is highly valuable practically. In addition, it is difficult to perform grafting under mild conditions in prior art, and therefore application of the present invention has a high technical significance.

The polymer compound having at least one amino group (a) used in the first invention of the present application is only required to have at least one amino group, and may contain a constituent unit having no amino group in constituent units thereof. Therefore, each of polymers having the structures represented by the above general formulae (1) to (5) may contain a constituent unit having no amino group in addition to each of the constituent units of the structures represented by the above general formulae (1) to (5), or does not have to contain the constituent unit having no amino group. Examples of the constituent unit having no amino group include sulfur dioxide, acrylamide, allyl alcohol, and acrylic acid. However, the constituent unit having no amino group is not limited thereto.

The amino group in the polymer compound having at least one amino group (a) used in the first invention of the present application may be a primary amino group, a secondary amino group, or a tertiary amino group, and is particularly preferably a primary amino group or a secondary amino group.

The number of the amino group in the polymer compound having at least one amino group (a) is not particularly limited, but is preferably from 5 to 15000, and particularly preferably from 8 to 3000 per polymer from a viewpoint of reactivity, usability, and the like. In terms of the number per molecular weight of the polymer compound, the number is preferably from 5 to 230, and particularly preferably from 10 to 130 per molecular weight 10000. When the number of the amino group is not too small, an introduction ratio of alkylene oxide as a grafting initiation point is not too small, and deterioration of a graft efficiency is suppressed.

The molecular weight of the polymer compound having at least one amino group (a) used in the first invention of the present application is not particularly limited, but is preferably from 500 to 10000000, and particularly preferably from 500 to 1000000 in terms of a number average molecular weight from a viewpoint of reactivity, viscosity, handling, yield, and the like.

The number of the repeating units of the polymer compound having at least one amino group (a) used in the first invention of the present application is not particularly limited, but is preferably form 10 to 150000, and particularly preferably from 10 to 3000 from a viewpoint of reactivity, viscosity, handling, yield, and the like.

The second invention of the present application is a polyamine graft polymer obtained by polymerizing a polyamine derivative obtained by polymerizing a modified allylamine monomer obtained by a reaction between (a') an allylamine monomer having at least one allyl group and at least one amino group and (b) a compound having at least one epoxy group; and (c) an ethylenically unsaturated monomer.

[(a') Allylamine Monomer Having at Least One Allyl Group and at Least One Amino Group]

As the allylamine monomer having at least one allyl group and at least one amino group (a') used in the second invention of the present application, any polymerizable compound having at least one allyl group and at least one amino group in a structure thereof can be used, but an allylamine compound having a structure represented by general formula (a1) is preferable.

[FORMULA 17]

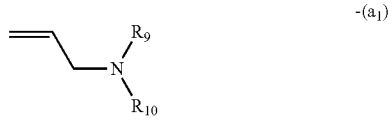
-(a₁)

In general formula (a1), at least one of $R_9$ and $R_{10}$ is a hydrogen atom, and the other is a hydrogen atom or a hydrocarbon group having 1 to 8 carbon atoms, and is preferably a hydrogen atom or an alkyl group having 1 to 3 carbon atoms.

It is particularly preferable from a viewpoint of polymerizability or the like that one of $R_9$ and $R_{10}$ is also an allyl group in general formula (a1), that is, the allylamine monomer (a') is a diallylamine monomer having two allyl groups.

It is preferable that at least a part of the allylamine monomer (a') used in production of the second invention of the present application is a diallylamine monomer having two allyl groups from a viewpoint of obtaining high polymerizability. It is more preferable that 30 mol % or more of the allylamine monomer (a') is a diallylamine monomer. It is particularly preferable that 50 mol % or more of the allylamine monomer (a') is a diallylamine monomer.

In general formula (a1), when one of $R_9$ and $R_{10}$ (for example, $R_9$) is a hydrogen atom, the other (in this case, $R_{10}$) is preferably a hydrogen atom, a methyl group, an ethyl group, an allyl group, or a benzyl group. That is, the allylamine compound having a structure represented by general formula (a1) is preferably allylamine, methyl allylamine, ethyl allylamine, diallylamine, or benzyl allylamine.

An organic acid salt or an inorganic acid salt of the allylamine compound having a structure represented by general formula (a1) also can be preferably used as the allylamine monomer having at least one allyl group and at least one amino group (a') in the second invention of the present application. As a counter ion in the organic acid salt or the inorganic acid salt, a halogen ion (more preferably, Cl⁻, Br⁻, or I⁻), a methyl sulfate ion, an ethyl sulfate ion, a methanesulfonate ion, a 2-hydroxy-1-ethanesulfonate ion, an acetate ion, or a hydroxy acetate ion is preferable.

[(b) Compound Having at Least One Epoxy Group]

As the compound having at least one epoxy group (b) used in the first and second inventions of the present application, any compound having at least one epoxy group in a structure thereof can be used. In producing the polyamine graft polymer of the first invention of the present application, the compound having at least one epoxy group (b) reacts with an amino group in the polymer compound having at least one amino group (a) to generate a polyamine derivative having a side chain containing a hydroxy group at a terminal (hereinafter, also referred to as "trunk polymer 1"). The trunk polymer 1 has a hydroxy group in a side chain, and therefore is highly reactive with a carbon-carbon double bond in the ethylenically unsaturated monomer (c). A structure or a group derived from the ethylenically unsaturated monomer (c) can be grafted on the trunk polymer 1 using a carbon atom adjacent to the hydroxy group as a starting point under relatively mild conditions.

In producing the polyamine graft polymer of the second invention of the present application, the compound having at least one epoxy group (b) reacts with an amino group in the allylamine monomer having at least one allyl group and at least one amino group (a') to generate a modified allylamine monomer. The modified allylamine monomer is used in a subsequent step. In this regard, the second invention of the present application is different from the first invention of the present application in which the compound having at least one epoxy group (b) reacts with the polymer compound (a). Due to such a difference, the polyamine graft polymer of the second invention of the present application can be produced with a high efficiency and high controllability, and can realize a desired structure at a high degree of freedom by introduction of a copolymerization component or the like.

The compound having at least one epoxy group (b) used in the first and second inventions of the present application is preferably a compound represented by the following general formula (6). R in general formula (6) is a substituted or unsubstituted hydrocarbon group.

[FORMULA 18]

-(6)

A compound represented by general formula (6) is preferable because the compound represented by general formula (6) is highly reactive with an amino group in the polymer compound having at least one amino group (a) or the allylamine monomer (a'), and can safely and stably impart a side chain containing a hydroxy group at a terminal onto a polymer compound with a simple operation under relatively mild conditions without requiring a high temperature or a radiation.

The compound having at least one epoxy group (b) used in the first and second inventions of the present application is preferably a compound represented by the following general formula (7), in which $R_1$ to $R_4$ are formed of a combination of specific groups.

[FORMULA 19]

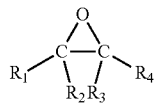
-(7)

The compound represented by general formula (7), in which $R_1$ to $R_4$ are formed of a combination of specific groups is more specifically a compound selected from the group consisting of (1) ethylene oxide in which each of $R_1$, $R_2$, $R_3$, and $R_4$ in the formula is a hydrogen atom, (2) an epoxy compound in which $R_1$, $R_2$, $R_3$, and $R_4$ in the formula are each independently a hydrogen atom or a linear or branched saturated hydrocarbon group having a hydroxy group in the chain and having 1 to 8 carbon atoms (not all of $R_1$, $R_2$, $R_3$, and $R_4$ are hydrogen atoms), (3) an epoxy compound in which $R_1$, $R_2$, $R_3$, and $R_4$ in the formula are each independently a hydrogen atom or a linear or branched alkyl group having 1 to 18 carbon atoms (not all of $R_1$, $R_2$, $R_3$, and $R_4$ are hydrogen atoms), (4) an epoxy compound in which $R_1$, $R_2$, $R_3$, and $R_4$ in the formula are each independently a hydrogen atom or a linear or branched saturated hydrocarbon group having an ether bond in the chain and having 1 to 8 carbon atoms (not all of $R_1$, $R_2$, $R_3$, and $R_4$ are hydrogen atoms), (5) an epoxy compound in which $R_1$, $R_2$, $R_3$, and $R_4$ in the formula are each independently a hydrogen atom or a halogen atom (not all of $R_1$, $R_2$, $R_3$, and $R_4$ are hydrogen atoms), (6) an epoxy compound in which $R_1$, $R_2$, $R_3$, and $R_4$ in the formula are each independently a hydrogen atom or an unsaturated hydrocarbon group (not all of $R_1$, $R_2$, $R_3$, and $R_4$ are hydrogen atoms), (7) an epoxy compound in which $R_1$, $R_2$, $R_3$, and $R_4$ in the formula are each independently a hydrogen atom or a hydrocarbon group containing an alicyclic hydrocarbon group or a cyclic hydrocarbon group having an unsaturated bond (not all of $R_1$, $R_2$, $R_3$, and $R_4$ are hydrogen atoms), (8) an epoxy compound in which $R_1$, $R_2$, $R_3$, and $R_4$ in the formula are each independently a hydrogen atom or a hydrocarbon group containing an aromatic ring or a heterocyclic ring (not all of $R_1$, $R_2$, $R_3$, and $R_4$ are hydrogen atoms), (9) a polyfunctional epoxy compound in which $R_1$, $R_2$, $R_3$, and $R_4$ in the formula are each independently a hydrogen atom or a hydrocarbon group containing an epoxy ring (not all of $R_1$, $R_2$, $R_3$, and $R_4$ are hydrogen atoms), (10) an epoxy compound in which $R_1$, $R_2$, $R_3$, and $R_4$ in the formula are each independently a hydrogen atom or a linear or branched saturated hydrocarbon group containing an alkoxysilyl in the chain and having 3 to 12 carbon atoms (not all of $R_1$, $R_2$, $R_3$, and $R_4$ are hydrogen atoms), (11) an epoxy compound in which $R_1$, $R_2$, $R_3$, and $R_4$ in the formula are each independently a hydrogen atom or a hydrocarbon group containing a fluorine atom in the chain (not all of $R_1$, $R_2$, $R_3$, and $R_4$ are hydrogen atoms), (12) an epoxy compound in which $R_1$, $R_2$, $R_3$, and $R_4$ in the formula are each independently a hydrogen atom or a hydrocarbon group containing a carboxyl group in the chain (not all of $R_1$, $R_2$, $R_3$, and $R_4$ are hydrogen atoms), (13) an epoxy compound in which $R_1$, $R_2$, $R_3$, and $R_4$ in the formula are each independently a hydrogen atom or a linear or branched saturated hydrocarbon group containing an ester bond or an amide bond in the chain and having 1 to 12 carbon atoms (not all of $R_1$, $R_2$, $R_3$, and $R_4$ are hydrogen atoms), and (14) an epoxy compound in which $R_1$, $R_2$, $R_3$, and $R_4$ in the formula are each independently a hydrogen atom or a hydrocarbon group containing a sulfonate group in the chain (not all of $R_1$, $R_2$, $R_3$, and $R_4$ are hydrogen atoms).

These compounds are preferable because these compounds are highly reactive with an amino group in the polymer compound having at least one amino group (a) or the allylamine monomer (a'), and can safely and stably impart a side chain containing a hydroxy group at a terminal onto a polymer compound with a simple operation under relatively mild conditions without requiring a high temperature or a radiation.

Specific examples of the compound include ethylene oxide (refer to the following formula for a structure thereof),

[FORMULA 20]

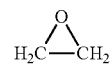

glycidol (refer to the following formula for the structure thereof),

[FORMULA 21]

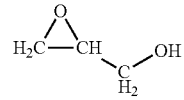

propylene oxide (refer to the following formula for the structure thereof),

[FORMULA 22]

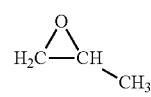

butylene oxide, 2,3-butylene oxide, 1,2-epoxy hexane, and 1,2-epoxy hexadecane,
glycidyl methyl ether (refer to the following formula for the structure thereof),

[FORMULA 23]

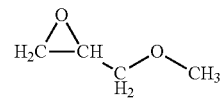

ethyl glycidyl ether, glycidyl isopropyl ether, and triglycidyl isocyanurate,
epichlorohydrin (refer to the following formula for the structure thereof),

[FORMULA 24]

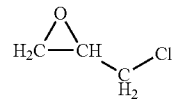

epibromohydrin and 2-(chloromethyl)-1,2-epoxy butane, 1,3-butadiene monoxide (refer to the following formula for the structure thereof),

[FORMULA 25]

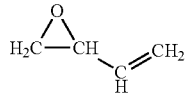

1,2-epoxy-5-hexene and allyl glycidyl ether,
1,2-epoxy cyclopentane (refer to the following formula for the structure thereof),

[FORMULA 26]

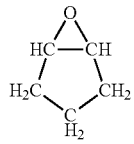

1,2-epoxy cyclohexane and 1,2-epoxy-4-vinyl cyclohexane
3,4-epoxy tetrahydrofuran,
styrene oxide (refer to the following formula for the structure thereof),

[FORMULA 27]

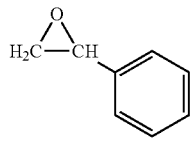

glycidyl phenyl ether and 4-glycidyloxy carbazole,
1,2:3,4-diepoxy butane (refer to the following formula for the structure thereof),

[FORMULA 28]

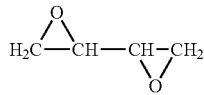

1,4-butanediol diglycidyl ether and ethylene glycol diglycidyl ether,
3-glycidoxypropyl trimethoxysilane (refer to the following formula for the structure thereof),

[FORMULA 29]

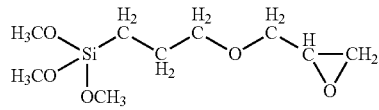

and 3-glycidyloxypropyl (dimethoxy) methylsilane,
1,2-epoxy-1H, 1H, 2H, 3H, 3H heptadecafluoro undecane (refer to the following formula for the structure thereof),

[FORMULA 30]

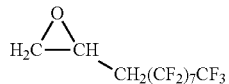

epoxy succinic acid (refer to the following formula for the structure thereof),

[FORMULA 31]

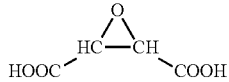

glycidyl butyrate (refer to the following formula for the structure thereof),

[FORMULA 32]

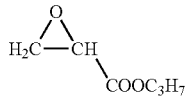

and N-glycidylphthalimide, and
glycidyl nitrobenzsulfonate (refer to the following formula for the structure thereof),

[FORMULA 33]

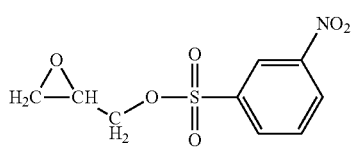

and glycidyl-p-toluenesulfonate. However, the compound represented by general formula (7), in which $R_1$ to $R_4$ are formed of a combination of specific groups is not limited thereto.

(Trunk Polymer 1)

In producing the polyamine graft polymer of the first invention of the present application, by a reaction between the compound having at least one epoxy group (b) and the polymer compound having at least one amino group (a), the trunk polymer 1 is formed. The trunk polymer 1 has a hydroxy group in a side chain, and therefore is highly reactive with a carbon-carbon double bond in the ethylenically unsaturated monomer (c). A side chain structure derived from the ethylenically unsaturated monomer (c) or a functional group can be grafted on the trunk polymer 1 using a carbon atom adjacent to the hydroxy group as a starting point.

The trunk polymer 1 is only required to be a polyamine derivative obtained by a reaction between the compound having at least one epoxy group (b) and the polymer compound having at least one amino group (a), and another limitation is not particularly imposed. However, particularly preferable examples of the trunk polymer 1 include (A) a polyamine derivative obtained by a reaction between an allylamine (co)polymer having a structure represented by general formula (3) and propylene oxide, (B) a polyamine polymer obtained by a reaction between an allylamine (co)polymer having a structure represented by general formula (3) and glycidol, (C) a polyamine polymer obtained by a reaction between a diallylamine (co)polymer having a structure represented by general formula (4) and glycidol, and (D) a polyamine polymer obtained by a reaction between an allylamine (co)polymer having a structure represented by general formula (3) and 1,2-epoxy octane.

A ratio of the compound having at least one epoxy group (b) to react with the polymer compound having at least one amino group (a) is not particularly limited. However, 0.01 to 2 equivalents of epoxy groups are preferable, and 0.1 to 2 equivalents thereof are particularly preferable with respect to an amino group in the polymer compound having at least one amino group (a).

When the amino group is a primary amino group, 0.1 to 2 equivalents of epoxy groups are particularly preferable with respect to the amino group. When the amino group is a secondary amino group, 0.1 to 1 equivalent of epoxy group is particularly preferable with respect to the amino group.

In the polyamine derivative (A) obtained by a reaction between an allylamine (co)polymer having a structure represented by general formula (3) and propylene oxide as one of the preferable trunk polymers 1, a reaction is preferably performed at a ratio of about 2 equivalents of epoxy groups with respect to an amino group in the allylamine (co)polymer having a structure represented by general formula (3). In this case, the resulting trunk polymer 1 has a structure represented by the following formula (A).

[FORMULA 34]

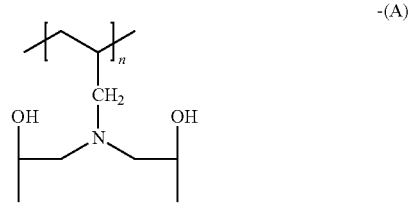
-(A)

In the polyamine polymer (B) obtained by a reaction between an allylamine (co)polymer having a structure represented by general formula (3) and glycidol as one of the preferable trunk polymers 1, a reaction is preferably performed at a ratio of about 2 equivalents of epoxy groups with respect to an amino group in the allylamine (co)polymer having a structure represented by general formula (3). In this case, the resulting trunk polymer 1 has a structure represented by the following formula (B).

[FORMULA 35]

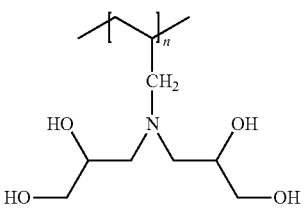
-(B)

In the polyamine polymer (C) obtained by a reaction between a diallylamine (co)polymer having a structure represented by general formula (4) and glycidol as one of the preferable trunk polymers 1, a reaction is preferably performed at a ratio of about 1 equivalent of epoxy group with respect to an amino group in the diallylamine (co)polymer having a structure represented by general formula (4). In this case, the resulting trunk polymer 1 has a structure represented by the following formula (C).

[FORMULA 36]

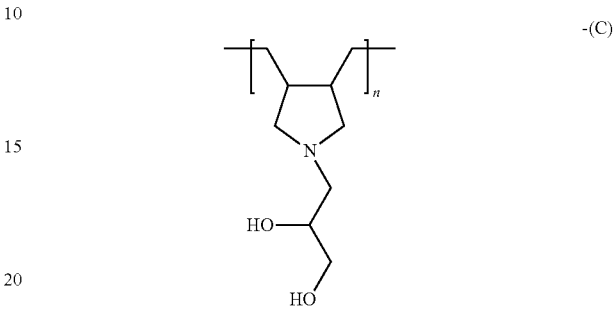
-(C)

In the polyamine polymer (D) obtained by a reaction between an allylamine (co)polymer having a structure represented by general formula (3) and 1,2-epoxy octane as one of the preferable trunk polymers 1, a reaction is preferably performed at a ratio of about 0.1 equivalents of epoxy groups with respect to an amino group in the allylamine (co)polymer having a structure represented by general formula (3). In this case, the resulting trunk polymer 1 has a structure represented by the following formula (D).

[FORMULA 37]

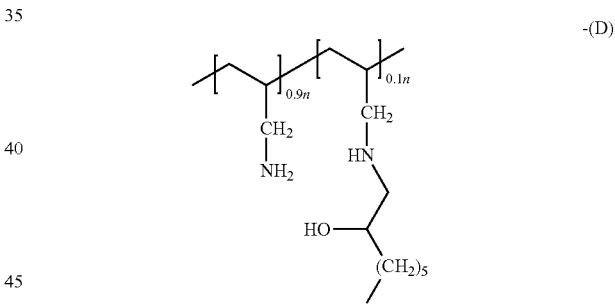
-(D)

The molecular weight of the trunk polymer 1 is not particularly limited, but is preferably from 500 to 10000000, and particularly preferably from 500 to 1000000 in terms of a number average molecular weight from a viewpoint of reactivity, viscosity, handling, yield, and the like. Usually, the molecular weight of the trunk polymer 1 is approximately defined by the molecular weight of the compound having at least one amino group (a). Therefore, by setting the molecular weight of the compound having at least one amino group (a) within the above preferable range, the trunk polymer 1 having a preferable molecular weight can be obtained.

The number of the repeating units of the trunk polymer 1 is not particularly limited, but is preferably from 10 to 150000, and particularly preferably from 10 to 3000 from a viewpoint of reactivity, viscosity, handling, yield, and the like. Usually, the number of the repeating units of the trunk polymer 1 is approximately the same as the number of the repeating units of the compound having at least one amino group (a). Therefore, by setting the number of the repeating units of the compound having at least one amino group (a) within the above preferable range, the trunk polymer 1 having a preferable number of the repeating units can be obtained.

(Modified Allylamine Monomer)

Unlike the first invention of the present application, in producing the polyamine graft polymer of the second invention of the present application, first, a modified allylamine monomer is obtained by a reaction between the allylamine monomer having at least one allyl group and at least one amino group (a') and the compound having at least one epoxy group (b). The allylamine monomer (a') generally has fewer structures acting as a steric hindrance than a polymer compound, and therefore is highly reactive with the compound having at least one epoxy group (b), can perform a reaction efficiently, and has high controllability of a reaction. For example, by properly controlling a grafting ratio or the like, or by introducing a copolymerization component or the like, if necessary, a polyamine graft polymer having a desired structure can be obtained easily. Due to an influence such as reactivity, a grafting ratio, or a copolymerization component, the structure of the polyamine graft polymer of the second invention of the present application is different from that of the polyamine graft polymer of the first invention of the present application.

Specifically, for example, in the first invention of the present application, when polyallylamine is selected as the polymer compound having at least one amino group (a) and propylene oxide is selected as the compound having at least one epoxy group (b), the trunk polymer 1 has a structure represented by formula (A). However, it is difficult to cause all the amino groups to react with an epoxy compound due to steric hindrance. Therefore, in this case, the trunk polymer 1 contains an unreacted amino group. Meanwhile, in the second invention of the present application, when allylamine is selected as the allylamine monomer having at least one allyl group and at least one amino group (a') and propylene oxide is selected as the compound having at least one epoxy group (b), a modified allylamine monomer is obtained by a reaction between the allylamine monomer and propylene oxide. However, it is possible to cause all the amino groups to react due to less steric hindrance to obtain a single kind of modified allylamine. Even when the reaction does not proceed well, it is possible to obtain a single kind of modified allylamine by removing an unreacted substance by a rectification operation. By polymerization using the single kind of modified allylamine obtained in this way, a polyamine derivative in this case (hereinafter, also referred to as "trunk polymer 2") substantially has only the structure represented by formula (A). By such a difference in the structure of the trunk polymer, the polyamine graft polymer of the first invention of the present application has a clearly different structure from that of the second invention of the present application.

A method for producing the above modified allylamine monomer is only required to be a method for causing the allylamine monomer having at least one allyl group and at least one amino group (a') to react with the compound having at least one epoxy group (b), and is not particularly limited. However, for example, the modified allylamine monomer can be produced by dissolving the allylamine monomer (a') in a polar solvent such as water, dropwise adding the compound having at least one epoxy group (b) thereto while the solution is cooled and stirred, and then causing a reaction at a temperature of 0 to 100° C. for 0.1 to 24 hours.

(Trunk Polymer 2)

In producing the polyamine graft polymer of the second invention of the present application, by polymerizing the modified allylamine monomer obtained in the above step, a polyamine derivative having a hydroxy group in a side chain ("trunk polymer 2") is obtained. This polyamine derivative (trunk polymer 2) has a similar structure to the polyamine graft polymer (trunk polymer 1) produced in producing the polyamine graft polymer of the first invention of the present application, but has a substantially different structure therefrom due to an influence such as reactivity, a grafting ratio, or a copolymerization component.

In polymerization of the trunk polymer 2, a monomer other than the modified allylamine monomer obtained by a reaction between the allylamine monomer having at least one allyl group and at least one amino group (a') and the compound having at least one epoxy group (b) may be copolymerized as a copolymerization component. The copolymerization component is only required to be copolymerizable with the above modified allylamine monomer, and the kind thereof is not particularly limited. However, preferable examples of the copolymerization component include acrylamide, methacrylamide, sulfur dioxide, and acrylic acid.

The amount of the copolymerization component is not particularly limited, but 1 to 10000 moles of the copolymerization component is preferably used, and 10 to 1000 moles of the copolymerization component is particularly preferably used with respect to 100 moles of the modified allylamine monomer.

The trunk polymer 2 has a hydroxy group in a side chain, and therefore is highly reactive with a carbon-carbon double bond in the ethylenically unsaturated monomer (c). A side chain structure derived from the ethylenically unsaturated monomer (c) or a functional group can be grafted on the trunk polymer using a carbon atom adjacent to the hydroxy group as a starting point.

The molecular weight and the number of the repeating units of the trunk polymer 2 are not particularly limited, but are usually preferably similar to the molecular weight and the number of the repeating units of the trunk polymer 1.

[(c) Ethylenically Unsaturated Monomer]

By graft polymerization of the ethylenically unsaturated monomer (c) with the trunk polymer 1 or the trunk polymer 2, the polyamine graft polymer of the first or second invention of the present application can be obtained. The ethylenically unsaturated monomer (c) is only required to contain at least one ethylenically unsaturated double bond, and another limitation is not imposed. However, the ethylenically unsaturated monomer (c) is preferably selected from the group consisting of a vinyl monomer, a styrene monomer, a methacrylate monomer, an acrylate monomer, an acrylamide monomer, an allyl monomer, a diallyl monomer, and an unsaturated carboxylic acid.

The molecular weight of the ethylenically unsaturated monomer (c) is not particularly limited, but is preferably from 28 to 1100, and particularly preferably from 28 to 500 from a viewpoint of a graft efficiency or the like.

The number of the carbon atoms in the ethylenically unsaturated monomer (c) is not particularly limited, but is preferably from 2 to 50, and particularly preferably from 2 to 30.

More specific examples of the ethylenically unsaturated monomer (c) preferably used in the present invention include styrene, divinylbenzene, sodium p-styrenesulfonate hydrate, vinylbenzyl trimethyl ammonium chloride, vinyl acetate, 1-vinylimidazole, 2-vinylpyridine, acrylonitrile, allylamine hydrochloride, diallylamine hydrochloride, dimethyl diamine hydrochloride, diallyl dimethyl ammonium chloride, particularly a 60% aqueous solution thereof, dimethyl acrylamide, hydroxyethyl acrylamide, dimethylaminopropyl acrylamide, dimethylaminopropyl acrylamide methyl chloride quaternary salt, N-(3-dimethylaminopropyl) methacrylamide, 3-(trimethoxysilyl) propyl methacrylate, methyl acrylate, and butyl acrylate. Among these monomers, dimethyl acrylamide, diallyl dimethyl ammonium chloride, styrene, acrylonitrile, and the like are particularly preferable from a viewpoint of reactivity with a carbon atom adjacent to a hydroxy group on the trunk polymer, usefulness of a group at a terminal of a side chain after grafting, or the like.

The chemical structure, the CAS number, or the like of each of these monomers is obvious to a person skilled in the art, and therefore description thereof will be omitted.

The ethylenically unsaturated monomer (c) can be used singly or in combination of two or more kinds thereof according to a purpose of the present invention. When the ethylenically unsaturated monomer (c) is used in combination of two or more kinds thereof, all of the monomers may correspond to the above preferable examples, or only some monomers may correspond to the above preferable examples.

The polyamine graft polymer of the first or second invention of the present application can be used suitably for various uses because a desired group can be introduced into a terminal of a side chain of a polymer compound having a relatively stable main chain. Particularly, the polyamine graft polymer in the first and second inventions of the present application can suitably and easily control reactivity with a specific substance and a dispersion/aggregation property in a specific medium, and can be used suitably for a use such as a printing ink, a paint, a dispersant such as a pigment, a pharmaceutical/drug delivery substance, a metal ion scavenger, or separation or concentration of a blood trace substance.

The polyamine graft polymer of the first or second invention of the present application can maintain a part of the amino groups of the polymer compound having at least one amino group (a) or the allylamine monomer (a') if desired, therefore can have both a property as polyamine such as reactivity, a basic property, or a charging property and the above property as a polyamine graft polymer, and are suitable for application in various uses particularly requiring control of reactivity or a dispersion/aggregation property.

Furthermore, the polyamine graft polymer of the first or second invention of the present application can be safely and stably produced with low introduction cost and a simple operation, and has a practical high value.

In addition, the polyamine graft polymer of the second invention of the present application can control a grafting ratio relatively easily, and a polyamine graft polymer having a desired structure can be obtained easily.

The polyamine graft polymer of the first invention of the present application is preferably produced by a method for producing the third invention of the present application described below, but is not limited thereto, and may be produced by another method.

The polyamine graft polymer of the second invention of the present application is preferably produced by a method for producing the fourth invention of the present application described below, but is not limited thereto, and may be produced by another method.

[Method for Producing Polyamine Graft Polymer]

A method for producing the polyamine graft polymer of the third invention of the present application includes the step of adding (c) an ethylenically unsaturated monomer and a radical polymerization initiator to a polyamine derivative obtained by a reaction between (a) a polymer compound having at least one amino group and (b) a compound having at least one epoxy group to polymerize in a polar solvent.

The polymer compound having at least one amino group (a), the compound having at least one epoxy group (b), the trunk polymer 1 (polyamine derivative obtained by a reaction between the polymer compound having at least one amino group (a) and the compound having at least one epoxy group (b)), and the ethylenically unsaturated monomer (c) used in a method for producing of the third invention of the present application are the same as those used in the first invention of the present application, and details thereof have been described above in relation to the first invention of the present application.

A method for producing the polyamine graft polymer of the fourth invention of the present application includes the step of adding (c) an ethylenically unsaturated monomer and a radical polymerization initiator to a polyamine derivative obtained by polymerizing a modified allylamine monomer obtained by a reaction between (a') an allylamine monomer having at least one allyl group and at least one amino group and (b) a compound having at least one epoxy group to polymerize in a polar solvent. The method of the fourth invention of the present application is different from the method of the third invention of the present application in that the compound having at least one epoxy group (b) reacts not with the polymer compound (a) but with the monomer (a').

The allylamine monomer having at least one allyl group and at least one amino group (a'), the compound having at least one epoxy group (b), the modified allylamine monomer obtained by a reaction between the allylamine monomer (a') and the compound (b), the trunk polymer 2 (polyamine derivative obtained by polymerizing the modified allylamine monomer), and the ethylenically unsaturated monomer (c) used in a method for producing the fourth invention of the present application are the same as those used in the second invention of the present application, and details thereof have been described above in relation to the second invention of the present application.

[Polar Solvent]

The polar solvent used in the third or fourth invention of the present application is not particularly limited, and can be selected appropriately according to a monomer used for polymerization, polymerization conditions, and the like. However, for example, a solvent having a dielectric constant of 5 or more can be used. As the polar solvent, a protic polar solvent such as water, ethanol, or acetic acid, and an aprotic polar solvent such as acetonitrile or acetone can be used. Among these solvents, water is preferably used from a viewpoint of easiness of a reaction, safety, cost, or the like.

[Radical Polymerization Initiator]

The radical polymerization initiator used in the third or fourth invention of the present application is only required to be able to generate a radical by stimulation such as heat, light, or oxidation-reduction under graft polymerization conditions, and another limitation is not imposed. In the third and fourth inventions of the present application, as the radical polymerization initiator, a polymerization initiator selected from the group consisting of an azo initiator represented by general formula (8) (in the formula, $R_5$ and $R_6$ are each independently an organic group having 1 to 20 carbon atoms, preferably an organic group having 4 to 7 carbon atoms, and preferably have an amino group, an amidino group, or an imidazolyl group), a peroxide initiator represented by general formula (9) (in the formula, $R_7$ and $R_8$ are each independently a hydrogen atom or an organic group having 1 to 20 carbon atoms, preferably an organic group having 4 to 7 carbon atoms), and an inorganic persulfate initiator represented by general formula (10) (in the formula, M is an alkali metal or ammonium, preferably potassium, sodium, or ammonium) is preferably used due to inexpensiveness and easy handling.

[FORMULA 38]

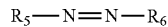
-(8)

[FORMULA 39]

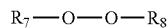
-(9)

[FORMULA 40]

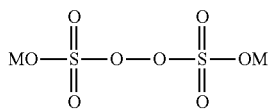
-(10)

Among the radical polymerization initiators, more specific examples of the initiator preferably used in the third or fourth invention of the present application include hydrogen peroxide (refer to the following formula (11) for a chemical structure thereof), tert-butyl hydroperoxide (TBHP, refer to the following formula (12) for a chemical structure thereof), benzoyl peroxide (BPO, refer to the following formula (13) for a chemical structure thereof), 2,2'-azobis(2-methyl propionamidine) dihydrochloride (trade name: V-50 manufactured by Wako Pure Chemical Industries, Ltd., refer to the following formula (14) for a chemical structure thereof), 2,2'-azobis[N-(2-carboxyethyl)-2-methylpropionamidine] hydrate (trade name: VA-057 manufactured by Wako Pure Chemical Industries, Ltd., refer to the following formula (15) for a chemical structure thereof), 2,2'-azobis[2-(2-imidazolin-2-yl) propane] dihydrochloride (trade name: VA-044 manufactured by Wako Pure Chemical Industries, Ltd., refer to the following formula (16) for a chemical structure thereof), 2,2'-azobis[2-(2-imidazolin-2-yl) propane] disulfate dihydrate (trade name: VA-046B manufactured by Wako Pure Chemical Industries, Ltd., refer to the following formula (17) for a chemical structure thereof), 2,2'-azobis[2-(2-imidazolin-2-yl) propane] (trade name: VA-061 manufactured by Wako Pure Chemical Industries, Ltd., refer to the following formula (18) for a chemical structure thereof), 2,2'-azobis(methyl 2-methylpropionate) (trade name: V-601 manufactured by Wako Pure Chemical Industries, Ltd., refer to the following formula (19) for a chemical structure thereof), ammonium persulfate (APS, refer to the following formula (20) for a chemical structure thereof), potassium persulfate (KPS, refer to the following formula (21) for a chemical structure thereof), and sodium persulfate (SPS, refer to the following formula (22) for a chemical structure thereof). Among these initiators, ammonium persulfate, potassium persulfate, and sodium persulfate are most preferable due to inexpensiveness and easy handling.

[FORMULA 41]

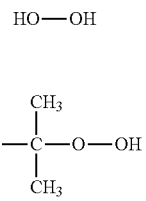
-(11)

[FORMULA 42]

-(12)

[FORMULA 43]

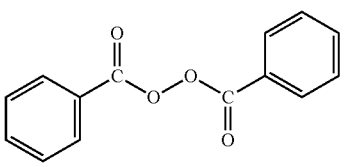
-(13)

[FORMULA 44]

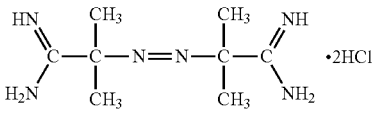
-(14)

[FORMULA 45]

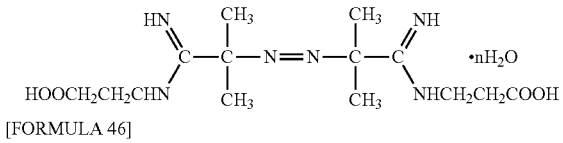
-(15)

[FORMULA 46]

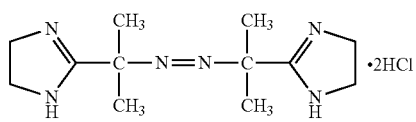
-(16)

[FORMULA 47]

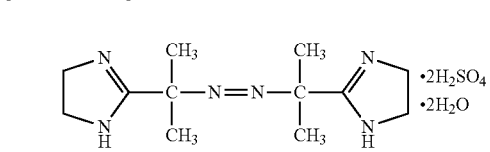
-(17)

[FORMULA 48]

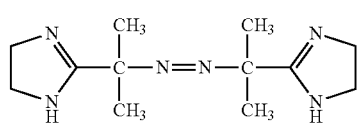
-(18)

[FORMULA 49]

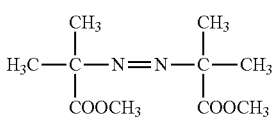
-(19)

[FORMULA 50]

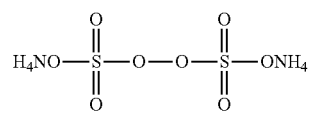
-(20)

[FORMULA 51]

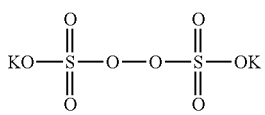
-(21)

[FORMULA 52]

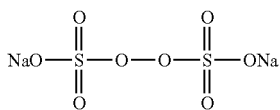
-(22)

In the method for producing the third or fourth invention of the present application, the polymerization temperature in the step for adding the ethylenically unsaturated monomer (c) and a radical polymerization initiator to the trunk polymer for polymerization is not particularly limited, but a polyamine derivative solution in a temperature range of from 0 to 100° C. is preferably used. The polyamine derivative solution in a temperature range of from 5 to 80° C. is more preferable, and the polyamine derivative solution in a temperature range of from 10 to 60° C. is particularly preferable.

Graft polymerization under mild conditions at such a relatively low temperature has been hardly achieved in prior art, and is a remarkable technical effect beyond prediction by a person skilled in the art. At the same time, the graft polymerization is a technical effect having a practical high value in that the graft polymerization can be safely and stably performed with lower introduction cost than prior art and a simple operation.

In the method for producing the third or fourth invention of the present application, the pH (depending on pKa of each of components) of the reaction solution (polyamine derivative solution) in the step for adding the ethylenically unsaturated monomer (c) and a radical polymerization initiator to the trunk polymer for polymerization is not particularly limited, but the pH is preferably 0 or more from a viewpoint of efficient proceed of graft polymerization. The pH is more preferably 4 or more, and particularly preferably 7 or more.

EXAMPLES

Hereinafter, the present invention will be described in more details with reference to Examples. The scope of the present invention is not limited by these Examples in any way.

<Measurement of Weight Average Molecular Weight of Copolymer>

The weight average molecular weight (Mw) of a copolymer was measured by gel permeation chromatography (GPC) using a high performance liquid chromatograph manufactured by Hitachi. As an eluent flow path pump, a Hitachi L-2130 inert pump was used. As a detector, Hitachi Chromaster (registered trademark) 5450 was used. A column obtained by connecting Asahi Pack aqueous gel filtration type GS-220HQ (exclusion limit molecular weight: 3,000) and GS-620HQ (exclusion limit molecular weight: 2,000,000) together was used. A samples was adjusted to a concentration of 0.5 g/100 ml with an eluent, and 20 μl thereof was used. As the eluent, a 0.4 mol/L sodium chloride aqueous solution was used. The column temperature was 30° C., and the flow rate was 1.0 ml/min. A calibration curve was determined using polyethylene glycol having a molecular weight of 106, 194, 420, 615, 1010, 1970, 3930, 7920, 12140, 18380, 21300, 25240, 50630, 77360, 116300, 199800, 278000, 454000, or 895500 as a standard sample. The weight average molecular weight (Mw) of a copolymer was determined based on the calibration curve.

<Measurement of pH of Reaction Solution>

The pH of a reaction solution was measured using a pH meter (B-212 manufactured by Horiba Ltd.). The reaction solution at 25° C. was dropwise added to a sensor, and a numerical value after one minute was used.

(Example 1) Production of Graft Polymer of Propylene Oxide-Modified Polyallylamine and Dimethyl Acrylamide Propylene oxide (2 equivalents with respect to amine) was dropwise added to 20% by mass polyallylamine (weight average molecular weight: 3000) while the polyallylamine was cooled with ice water and was stirred. After a reaction at 20° C. for 24 hours, the solution was concentrated to obtain propylene oxide-modified polyallylamine as an aqueous solution.

A part of the resulting solution was extracted, and 35% by mass hydrochloric acid was added thereto for neutralization to obtain an addition salt. Thereafter, reprecipitation was performed with tetrahydrofuran, and the precipitate was filtered off and was dried at 40° C. for 24 hours in vacuum. FIG. 1 illustrates an infrared spectrum of the resulting white powdery solid. In IR measurement, a peak derived from a methyl group was observed around 2969 cm$^{-1}$, and a peak derived from an amino group around 1637 cm$^{-1}$ was reduced. These results support generation of propylene oxide-modified polyallylamine.

Figure 2:
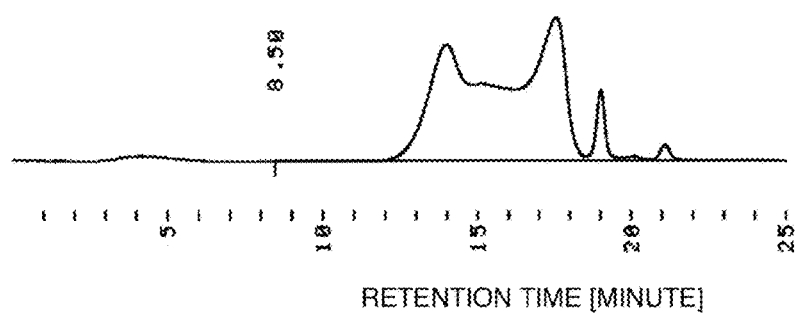
FIG. 2 illustrates a GPC chart of propylene oxide-modified polyallylamine in an example of the present invention.

The weight average molecular weight by GPC measurement was 3800. FIG. 2 illustrates a GPC chart obtained in this measurement.

Water was added to 42% by mass propylene oxide-modified polyallylamine prepared according to the above method such that the concentration became 14% by mass, and the resulting solution was stirred at 20° C. The reaction solution had a pH of 10. Subsequently, each of 65% by mass dimethylacrylamide (3 equivalents with respect to amine) and 12.01 g of 28.5% by mass APS aqueous solution (10 mol % with respect to monomer) was added thereto dividedly, and polymerization was performed for 24 hours to obtain a graft polymer of propylene oxide-modified polyallylamine and dimethyl acrylamide as an aqueous solution.

Figure 3:
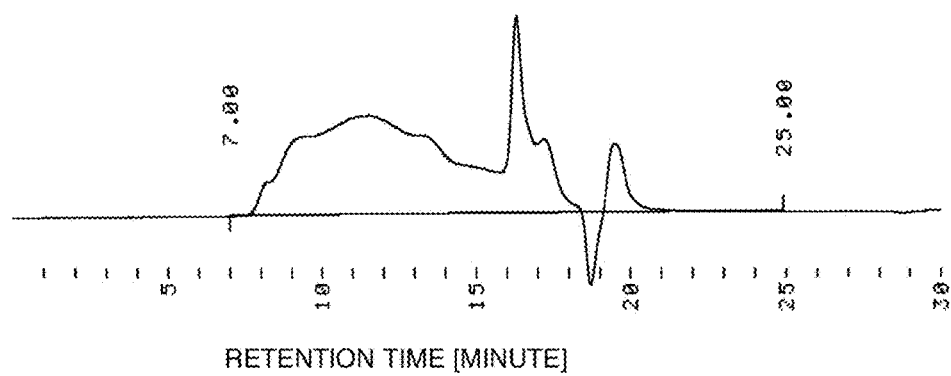
FIG. 3 illustrates a GPC chart of a graft polymer in an example of the present invention.

The weight average molecular weight by GPC measurement was 120000. FIG. 3 illustrates a GPC chart obtained in this measurement.

Figure 4:
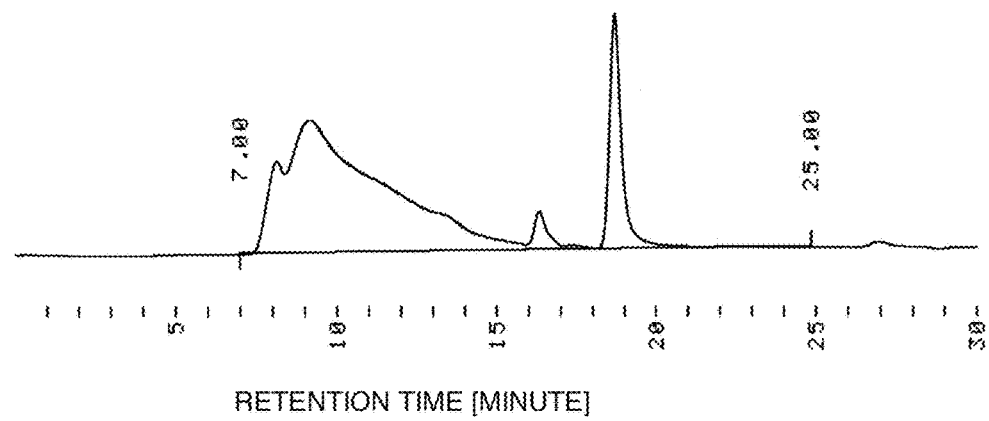
FIG. 4 illustrates a GPC chart of a graft polymer after purification in an example of the present invention.
Figure 5:
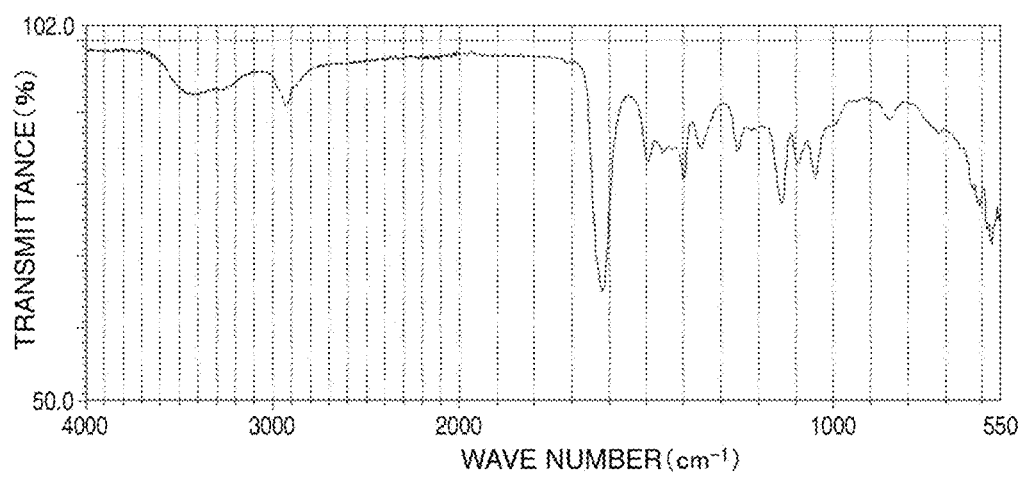
FIG. 5 illustrates an infrared spectrum of the graft polymer after purification in an example of the present invention.
Figure 6:
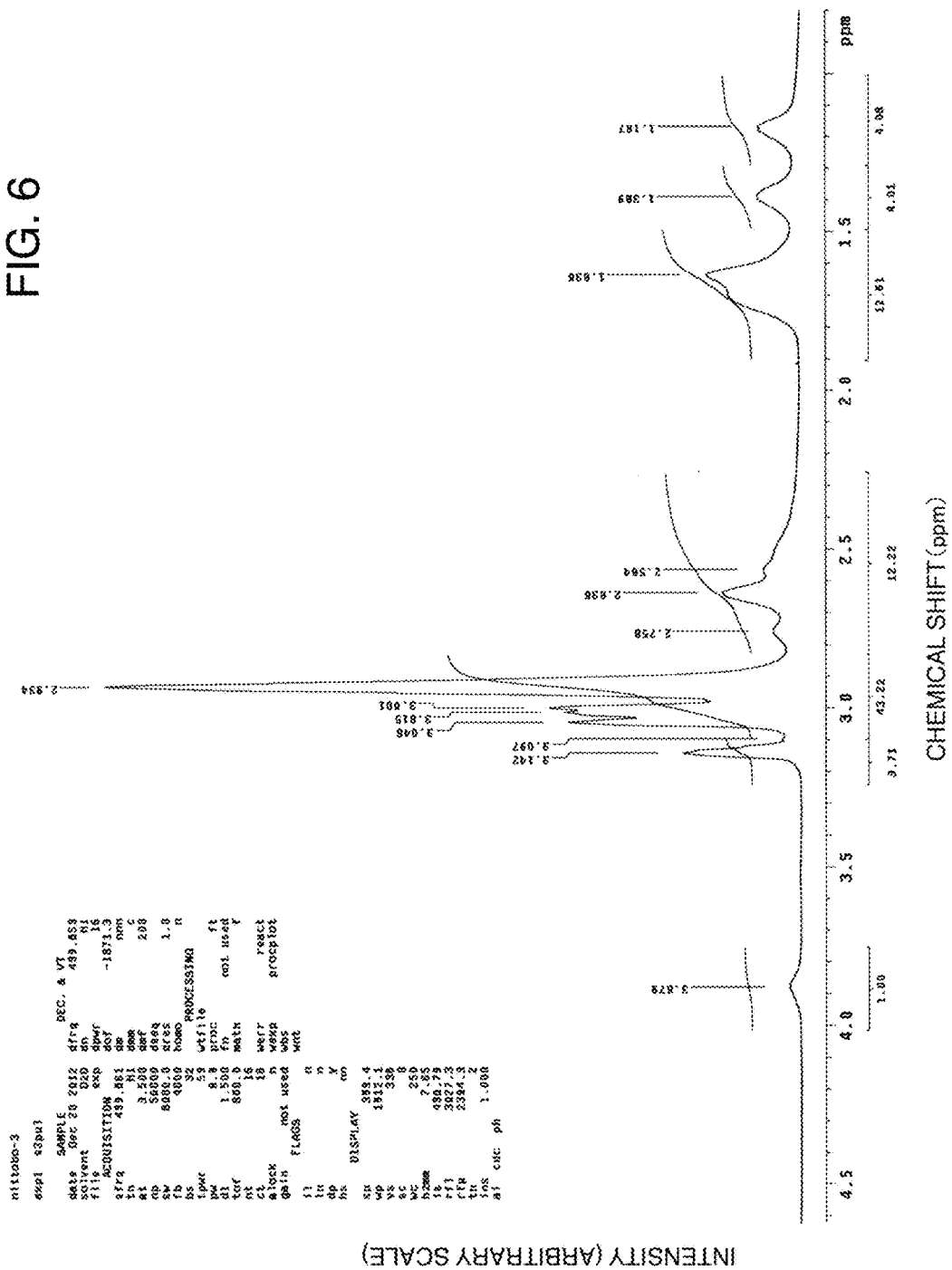
FIG. 6 illustrates a $^1$H NMR chart of the graft polymer after purification in an example of the present invention.

To a part of the resulting solution, 25% by mass sodium hydroxide was added. Thereafter, reprecipitation was performed with tetrahydrofuran, and the precipitate was filtered off and was dried at 40° C. for 24 hours in vacuum. The resulting white powdery solid was dissolved in water, and 35% by mass hydrochloric acid was added thereto for neutralization to obtain an addition salt. Thereafter, reprecipitation was performed with acetone, and the precipitate was filtered off and was dried at 40° C. for 24 hours in vacuum. The resulting white individual was dissolved in water, and 25% by mass sodium hydroxide was added thereto. The resulting solution was concentrated, and then was dried at 40° C. for 24 hours in vacuum. FIGS. 4 to 6 illustrate a GPC chart, an infrared spectrum, and $^1$H NMR of the resulting white solid.

As a result of GPC measurement, the weight average molecular weight was 322000. Absorption derived from an amide group was observed at 1617 cm$^{-1}$ in the infrared spectrum. As a result of $^1$H NMR measurement, a peak derived from a methyl group in the structure of propylene oxide-modified polyallylamine was obtained around 1.2 ppm, and a peak derived from a methyl group in the structure of dimethyl acrylamide was obtained around 2.9 to 3.1 ppm. An integration ratio thereof was 1.00:11.50. These results support generation of a graft polymer of propylene oxide-modified polyallylamine and dimethyl acrylamide.

(Example 2) Production of Graft Polymer of Propylene Oxide-Modified Polyallylamine and Diallyl Dimethyl Ammonium Chloride Water was added to 50% by mass propylene oxide-modified polyallylamine prepared in a similar manner to Example 1 such that the concentration became 30% by mass, and the resulting solution was stirred at 20° C. The reaction solution had a pH of 10. Subsequently, 65% by mass diallyl dimethyl ammonium chloride (3 equivalents with respect to amine) was added thereto. In addition, 96.08 g of 28.5% by mass APS aqueous solution (20 mol % with respect to monomer) was added thereto dividedly, and polymerization was performed for 72 hours to obtain a graft polymer of propylene oxide-modified polyallylamine and diallyl dimethyl ammonium chloride as an aqueous solution.

Figure 7:
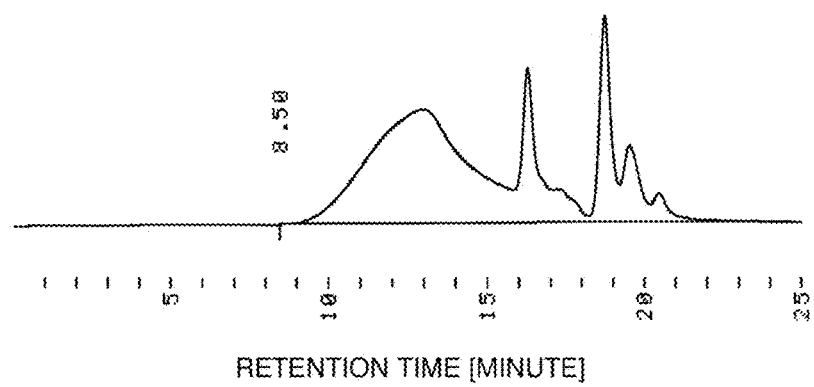
FIG. 7 illustrates a GPC chart of a graft polymer in another example of the present invention.

The weight average molecular weight by GPC measurement was 24000. FIG. 7 illustrates a GPC chart obtained in this measurement.

Figure 8:
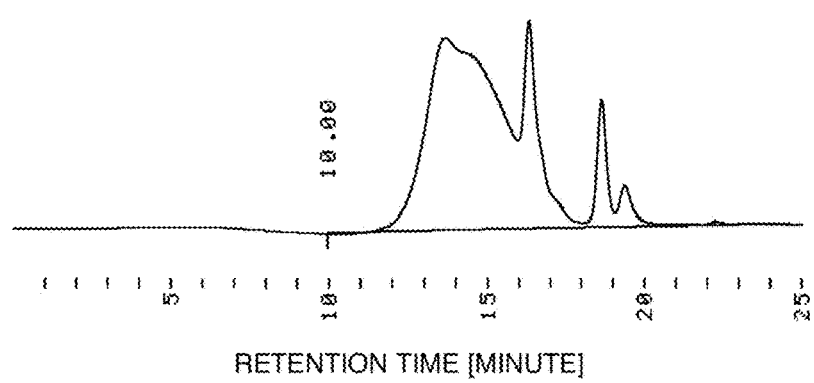
FIG. 8 illustrates a GPC chart of a graft polymer after purification in another example of the present invention.
Figure 9:
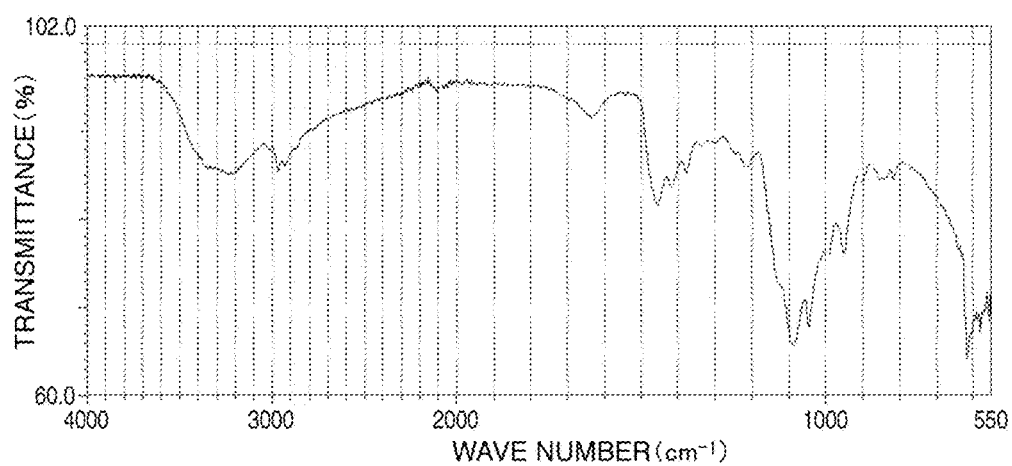
FIG. 9 illustrates an infrared spectrum of the graft polymer after purification in another example of the present invention.
Figure 10:
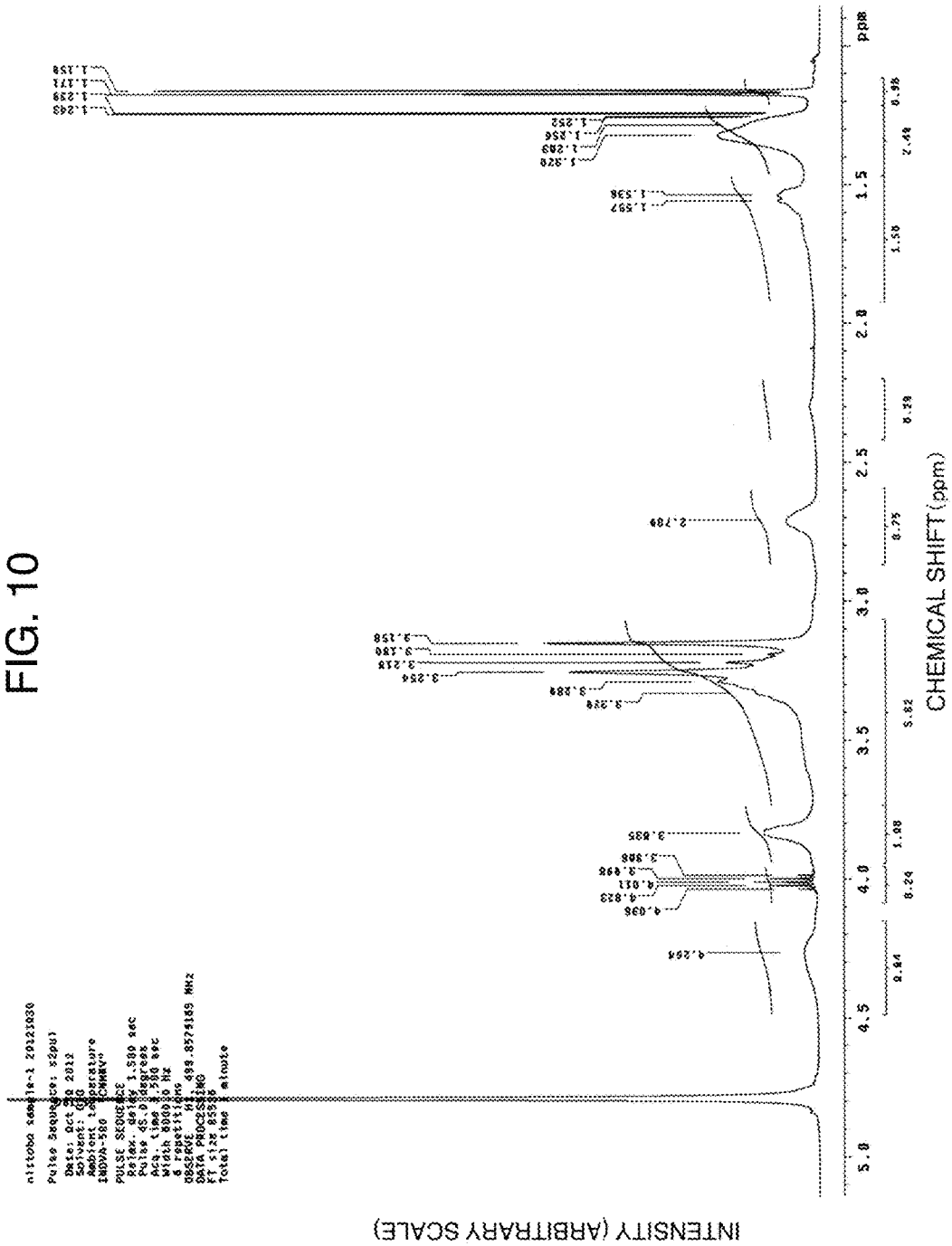
FIG. 10 illustrates a $^1$H NMR chart of the graft polymer after purification in another example of the present invention.

A part of the resulting solution was extracted, reprecipitation was performed with ethanol, and a filtrate was collected by filtration. Thereafter, the solution was concentrated, and was dried at 40° C. for 24 hours in vacuum. The resulting pale yellow solid was dissolved in water. Thereafter, reprecipitation was performed with 2-propyl alcohol, and the precipitate was filtered off and was dried at 40° C. for 24 hours in vacuum. FIGS. 8 to 10 illustrate a GPC chart, an infrared spectrum, and $^1$H NMR of the resulting white powdery solid.

As a result of GPC measurement, the weight average molecular weight was 4800. Absorption derived from a methyl group in the structure of diallyl dimethyl ammonium chloride was observed around 3010 cm$^{-1}$ in the infrared spectrum. As a result of $^1$H NMR measurement, a peak derived from a methyl group in the structure of propylene oxide-modified polyallylamine was obtained around 1.2 ppm, and a peak derived from a methyl group in the structure of diallyl dimethyl ammonium chloride was observed around 3.15 to 3.33 ppm. These results support generation of a graft polymer of propylene oxide-modified polyallylamine and diallyl dimethyl ammonium chloride.

(Example 3) Production of Graft Polymer of Propylene Oxide-Modified Polyallylamine and Styrene Propylene oxide (0.1 equivalents with respect to amine) was dropwise added to 20% by mass polyallylamine while the polyallylamine was cooled with ice water and was stirred. After a reaction at 20° C. for 24 hours, the solution was concentrated to obtain propylene oxide-modified polyallylamine as an aqueous solution.

Water was added to the propylene oxide-modified polyallylamine such that the concentration became 20% by mass, then styrene (0.3 equivalents with respect to amine) was added thereto, and the resulting solution was stirred at 20° C. The reaction solution had a pH of 12. Thereafter, 12.01 g of 28.5% by mass APS aqueous solution (20 mol % with respect to monomer) was added thereto, and polymerization was performed for 24 hours. Thereafter, the resulting solution was heated at 70° C. for 24 hours to obtain a graft polymer of propylene oxide-modified polyallylamine and styrene. The graft polymer had an average particle diameter of 120 nm.

Figure 11:
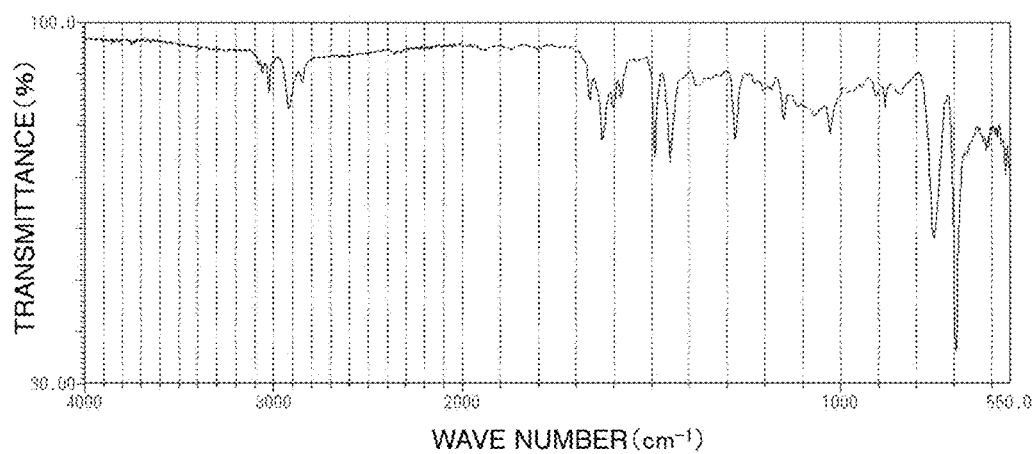
FIG. 11 illustrates an infrared spectrum of a graft polymer in another example of the present invention.

A part of the resulting milky white solution was extracted, reprecipitation was performed with tetrahydrofuran, and the precipitate was filtered off and was dried at 40° C. for 24 hours in vacuum. The resulting pale yellow solid was washed with water. Thereafter, the solid was filtered off and was dried at 40° C. for 24 hours in vacuum. The resulting white powdery solid was dispersed in water. Thereafter, salicylaldehyde was added thereto, precipitation was performed with 2-propyl alcohol, and the precipitate was filtered off and was dried at 40° C. for 24 hours in vacuum. FIG. 11 illustrates an infrared spectrum of the resulting yellow powdery solid.

Absorption derived from an aromatic ring was observed around 696 cm$^{-1}$ in the infrared spectrum. Absorption derived from an imino group in the structure of a reaction product of propylene oxide-modified polyallylamine and salicylaldehyde was observed at 1627 cm$^{-1}$. These results support generation of a graft polymer of propylene oxide-modified polyallylamine and styrene.

From the starting materials, the above analysis results, and the like, the obtained graft polymer was estimated to have a structure of the following formula (q, r, s, t, u, and w are each independently a positive integer).

[FORMULA 53]

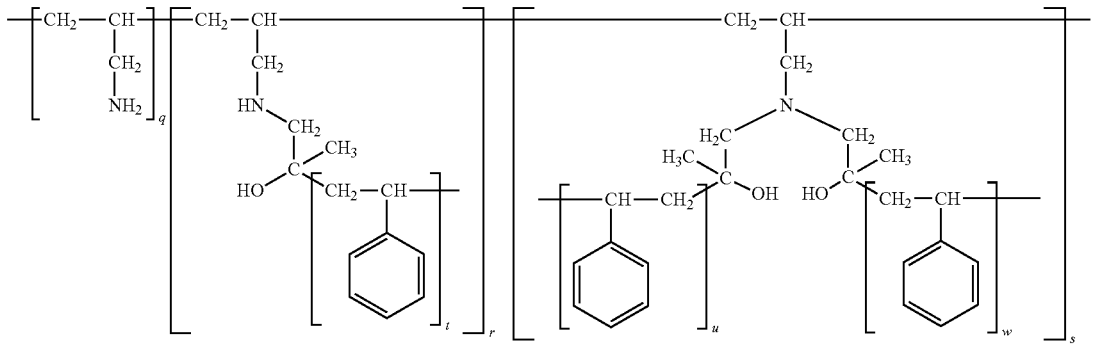

(Example 4) Production of Graft Polymer of
Propylene Oxide-Modified Polyallylamine and
Dimethyl Acrylamide (Production at pH7)

Water was added to 42% by mass propylene oxide-modified polyallylamine prepared in a similar manner to Example 1 such that the concentration became 14% by mass, and the resulting solution was stirred at 20° C. Subsequently, 35% by mass hydrochloric acid was added thereto to adjust the pH to 7. Each of dimethyl acrylamide (3 equivalents with respect to amine) and 12.01 g of 28.5% by mass APS aqueous solution (10 mol % with respect to monomer) was added thereto dividedly, and polymerization was performed for 24 hours to obtain a graft polymer of propylene oxide-modified polyallylamine and dimethyl acrylamide as an aqueous solution.

Figure 12:
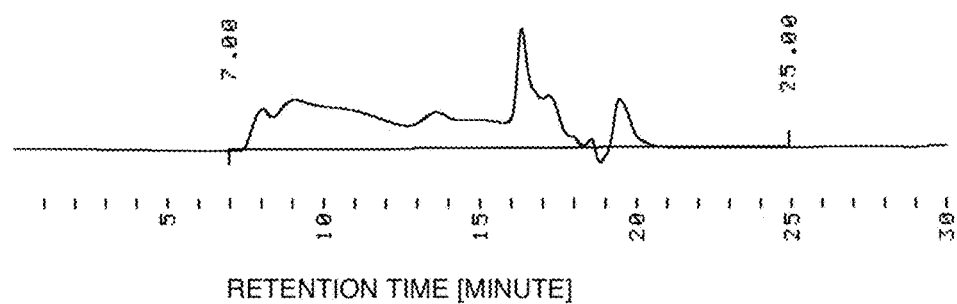
FIG. 12 illustrates a GPC chart of a graft polymer in an example of the present invention.

The weight average molecular weight by GPC measurement was 210000. FIG. 12 illustrates a GPC chart obtained in this measurement.

Figure 13:
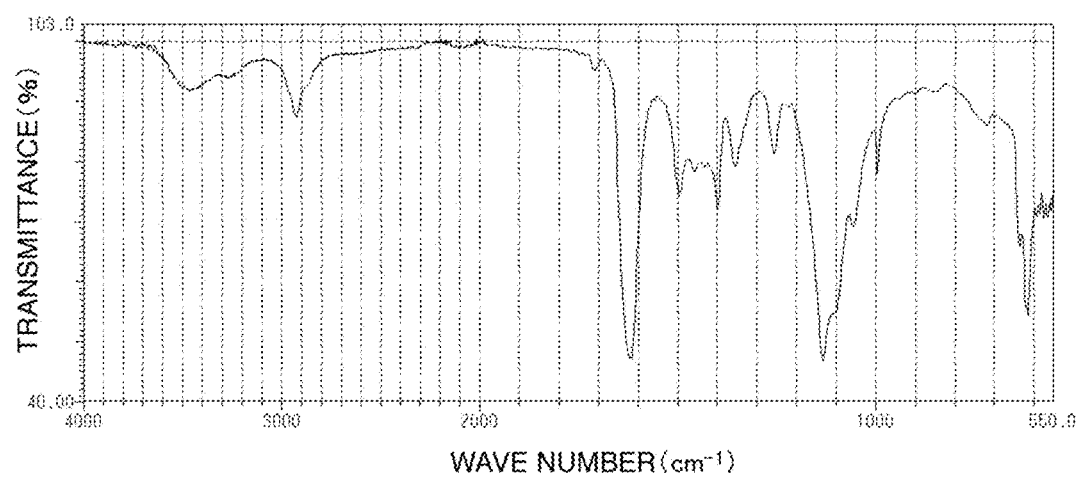
FIG. 13 illustrates an infrared spectrum of a graft polymer in an example of the present invention.

To a part of the resulting solution, 25% by mass sodium hydroxide was added. Thereafter, reprecipitation was performed with tetrahydrofuran, and the precipitate was filtered off and was dried at 40° C. for 24 hours in vacuum. The resulting white powdery solid was dissolved in water, and 35% by mass hydrochloric acid was added thereto for neutralization to obtain an addition salt. Thereafter, reprecipitation was performed with acetone, and the precipitate was filtered off and was dried at 40° C. for 24 hours in vacuum. FIG. 13 illustrates an infrared spectrum of the resulting white powdery individual.

Absorption derived from an amide group was observed at 1617 $cm^{-1}$ in the infrared spectrum. An inflection point derived from propylene oxide-modified polyallylamine was obtained around pH3 and pH8 by potentiometric titration. These results support generation of a graft polymer of propylene oxide-modified polyallylamine and dimethyl acrylamide.

(Example 5) Production of Graft Polymer of Epoxy
Octane-Modified Polyallylamine and Diallyl
Dimethyl Ammonium Chloride Water was added to 20% by mass polyallylamine such that the concentration became 13% by mass, and epoxy octane (0.1 equivalents with respect to amine) was dropwise added thereto while the solution was cooled with ice water and was stirred. After dropwise addition, the solution was allowed to react at 40° C. for 24 hours, and then was concentrated to obtain epoxy octane-modified polyallylamine as an aqueous solution.

Figure 14:
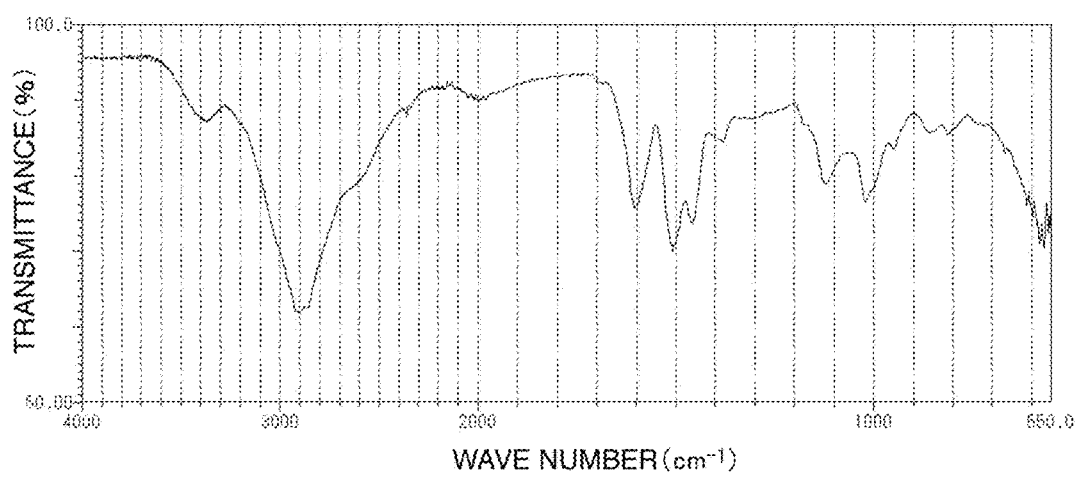
FIG. 14 illustrates an infrared spectrum of epoxyoctane-modified polyallylamine in an example of the present invention.

A part of the resulting solution was extracted, and 35% by mass hydrochloric acid was added thereto for neutralization to obtain an addition salt. Thereafter, reprecipitation was performed with 2-propyl alcohol, and the precipitate was filtered off and was dried at 40° C. for 24 hours in vacuum. FIG. 14 illustrates an infrared spectrum of the resulting white powdery solid. In IR measurement, a peak derived from a hydroxyl group was observed around 1120 $cm^{-1}$. These results support generation of epoxy octane-modified polyallylamine.

Water was added to 30% by mass epoxy octane-modified polyallylamine prepared according to the above method such that the concentration became 19% by mass, and the resulting solution was stirred at 20° C. The reaction solution had a pH of 12. Subsequently, each of 65% by mass diallyl dimethyl ammonium chloride (3 equivalents with respect to amine) and 14.42 g of 28.5% by mass APS aqueous solution (10 mol % with respect to monomer) was added thereto dividedly, and polymerization was performed for 24 hours. Thereafter, 14.42 g of 28.5% by mass APS aqueous solution (10 mol % with respect to monomer) was further added thereto dividedly to obtain a graft polymer of epoxy octane-modified polyallylamine and diallyl dimethyl ammonium chloride as an aqueous solution.

Figure 15:
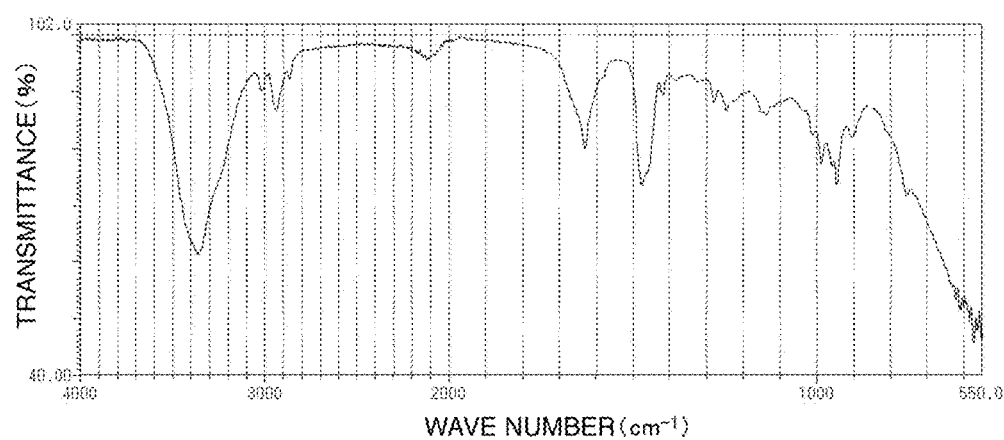
FIG. 15 illustrates an infrared spectrum of a graft polymer in an example of the present invention.

A part of the resulting solution was extracted, and was neutralized with a 25% by mass sodium hydroxide aqueous solution. Thereafter, reprecipitation was performed with ethanol, and a filtrate was collected by filtration. Thereafter, the solution was concentrated, and was dried at 40° C. for 24 hours in vacuum. The resulting pale yellow solid was dissolved in water. Thereafter, reprecipitation was performed with 2-propyl alcohol, and the precipitate was filtered off and was dried at 40° C. for 24 hours in vacuum. The resulting white powdery solid was dissolved in water. Thereafter, salicylaldehyde was added thereto, reprecipitation was performed with 2-propyl alcohol, and the precipitate was filtered off and was dried at 40° C. for 24 hours in vacuum. FIG. 15 illustrates an infrared spectrum of the resulting yellow powdery solid.

Absorption derived from a methyl group in the structure of diallyl dimethyl ammonium chloride was observed around 3010 $cm^{-1}$ in the infrared spectrum. Absorption derived from an imino group in the structure of a reaction product of epoxy octane-modified polyallylamine and salicylaldehyde was observed at 1627 $cm^{-1}$. These results support generation of a graft polymer of epoxy octane-modified polyallylamine and diallyl dimethyl ammonium chloride.

(Example 6) Production of Graft Polymer of
Ethylene Glycol Diglycidyl Ether-Modified
Polyallylamine and Diallyl Dimethyl Ammonium
Chloride Water was added to 20% by mass polyallylamine such that the concentration became 13% by mass, and ethylene glycol diglycidyl ether (0.05 equivalents with respect to amine) was dropwise added thereto while the solution was cooled with ice water and was stirred. After dropwise addition, the solution was allowed to react at 40° C. for 24 hours, and then was concentrated to obtain ethylene glycol diglycidyl ether-modified polyallylamine as an aqueous solution.

Figure 16:
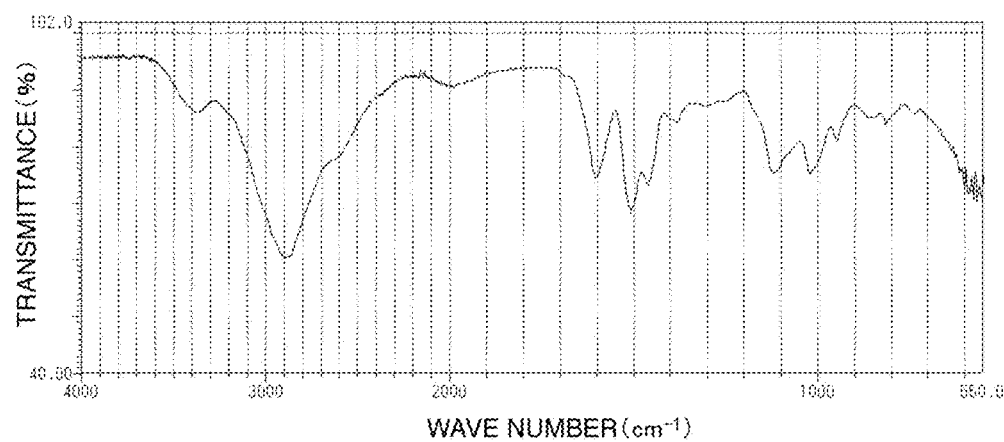
FIG. 16 illustrates an infrared spectrum of ethylene glycol diglycidyl ether-modified polyallylamine in an example of the present invention.

A part of the resulting solution was extracted, and 35% by mass hydrochloric acid was added thereto for neutralization to obtain an addition salt. Thereafter, reprecipitation was performed with 2-propyl alcohol, and the precipitate was filtered off and was dried at 40° C. for 24 hours in vacuum. FIG. 16 illustrates an infrared spectrum of the resulting white powdery solid. In IR measurement, a peak derived from a hydroxyl group was observed around 1120 $cm^{-1}$. These results support generation of ethylene glycol diglycidyl ether-modified polyallylamine.

Water was added to 30% by mass ethylene glycol diglycidyl ether-modified polyallylamine prepared according to the above method such that the concentration became 19% by mass, and the resulting solution was stirred at 20° C. The reaction solution had a pH of 12. Subsequently, each of 65% by mass diallyl dimethyl ammonium chloride (3 equivalents with respect to amine) and 14.42 g of 28.5% by mass APS aqueous solution (10 mol % with respect to monomer) was added thereto dividedly, and polymerization was performed for 24 hours to obtain a graft polymer of ethylene glycol diglycidyl ether-modified polyallylamine and diallyl dimethyl ammonium chloride as a yellow gel.

Figure 17:
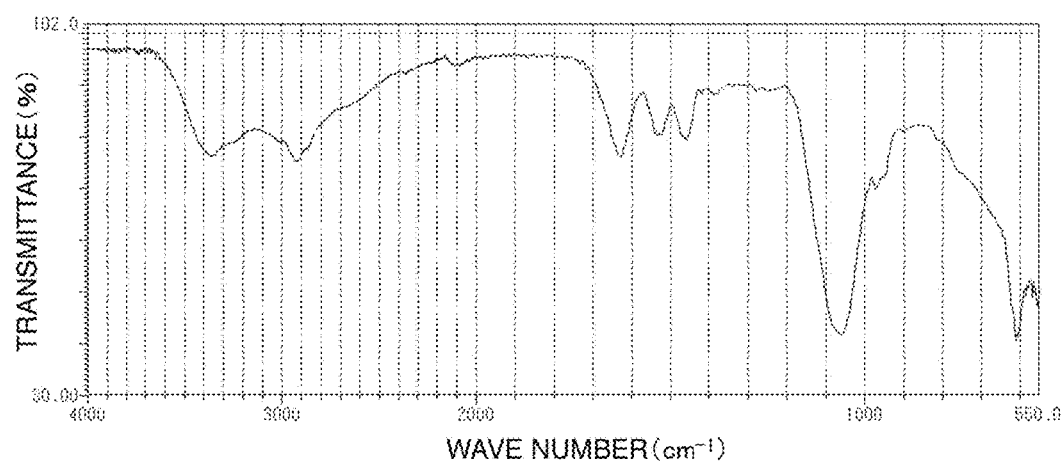
FIG. 17 illustrates an infrared spectrum of a graft polymer in an example of the present invention.

A part of the resulting gel was extracted, and was washed with water. Thereafter, the gel was filtered off and was dried at 40° C. for 24 hours in vacuum. The resulting pale yellow solid was dispersed in water. Thereafter, salicylaldehyde was added thereto, precipitation was performed with 2-propyl alcohol, and the precipitate was filtered off and was dried at 40° C. for 24 hours in vacuum. FIG. 17 illustrates an infrared spectrum of the resulting yellow powdery solid.

Absorption derived from a methyl group in the structure of diallyl dimethyl ammonium chloride was observed around 3010 cm$^{-1}$ in the infrared spectrum. Absorption derived from an imino group in the structure of a reaction product of ethylene glycol diglycidyl ether-modified polyallylamine and salicylaldehyde was observed at 1627 cm$^{-1}$. These results support generation of a graft polymer of ethylene glycol diglycidyl ether-modified polyallylamine and diallyl dimethyl ammonium chloride.

(Example 7) Production of Graft Polymer of Styrene Oxide-Modified Polyallylamine and Diallyl Dimethyl Ammonium Chloride Water was added to 20% by mass polyallylamine such that the concentration became 13% by mass, and styrene oxide (0.1 equivalents with respect to amine) was dropwise added thereto while the solution was cooled with ice water and was stirred. After dropwise addition, the solution was allowed to react at 40° C. for 24 hours, and then was concentrated to obtain styrene oxide-modified polyallylamine as an aqueous solution.

Figure 18:
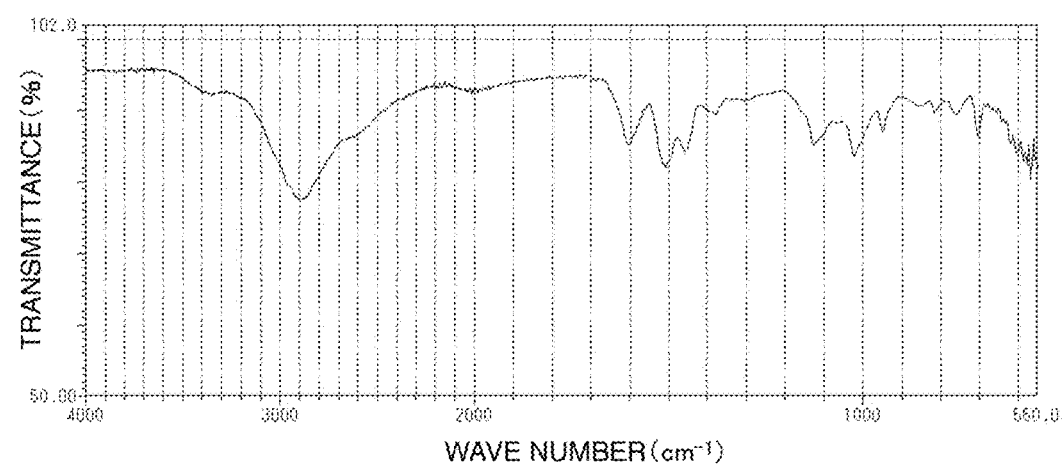
FIG. 18 illustrates an infrared spectrum of styrene oxide-modified polyallylamine in an example of the present invention.

A part of the resulting solution was extracted, and 35% by mass hydrochloric acid was added thereto for neutralization to obtain an addition salt. Thereafter, reprecipitation was performed with 2-propyl alcohol, and the precipitate was filtered off and was dried at 40° C. for 24 hours in vacuum. FIG. 18 illustrates an infrared spectrum of the resulting white powdery solid. In IR measurement, a peak derived from a hydroxyl group was observed around 1120 cm$^{-1}$. These results support generation of styrene oxide-modified polyallylamine.

Water was added to 30% by mass styrene oxide-modified polyallylamine prepared according to the above method such that the concentration became 19% by mass, and the resulting solution was stirred at 20° C. The reaction solution had a pH of 12. Subsequently, each of 65% by mass diallyl dimethyl ammonium chloride (3 equivalents with respect to amine) and 14.42 g of 28.5% by mass APS aqueous solution (10 mol % with respect to monomer) was added thereto dividedly, and polymerization was performed for 24 hours. Thereafter, 14.42 g of 28.5% by mass APS aqueous solution (10 mol % with respect to monomer) was further added thereto dividedly to obtain a graft polymer of styrene oxide-modified polyallylamine and diallyl dimethyl ammonium chloride as an aqueous solution.

Figure 19:
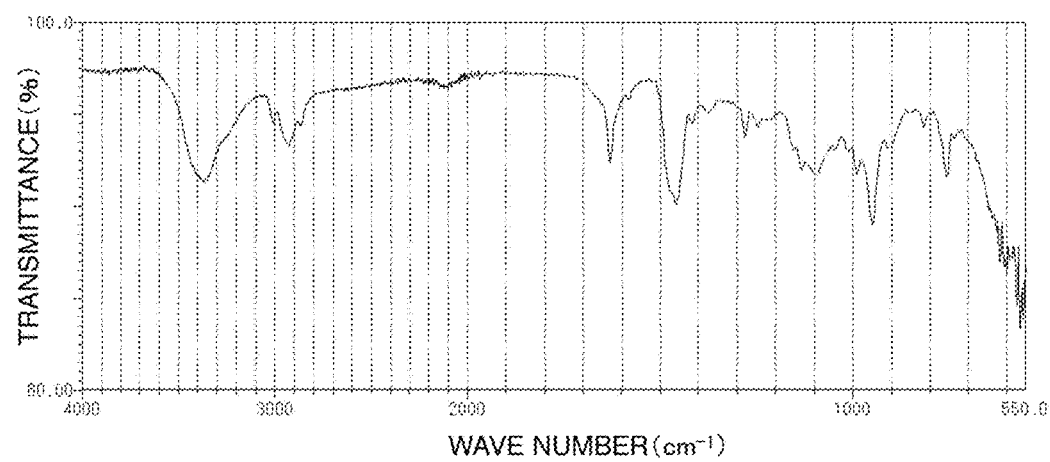
FIG. 19 illustrates an infrared spectrum of a graft polymer in an example of the present invention.

A part of the resulting solution was extracted, and was neutralized with a 25% by mass sodium hydroxide aqueous solution. Thereafter, reprecipitation was performed with ethanol, and a filtrate was collected by filtration. Thereafter, the solution was concentrated, and was dried at 40° C. for 24 hours in vacuum. The resulting pale yellow solid was dissolved in water. Thereafter, reprecipitation was performed with 2-propyl alcohol, and the precipitate was filtered off and was dried at 40° C. for 24 hours in vacuum. The resulting white powdery solid was dissolved in water. Thereafter, salicylaldehyde was added thereto, reprecipitation was performed with 2-propyl alcohol, and the precipitate was filtered off and was dried at 40° C. for 24 hours in vacuum. FIG. 19 illustrates an infrared spectrum of the resulting yellow powdery solid.

Absorption derived from a methyl group in the structure of diallyl dimethyl ammonium chloride was observed around 3010 cm$^{-1}$ in the infrared spectrum. Absorption derived from an imino group in the structure of a reaction product of styrene oxide-modified polyallylamine and salicylaldehyde was observed at 1627 cm$^{-1}$. These results support generation of a graft polymer of styrene oxide-modified polyallylamine and diallyl dimethyl ammonium chloride.

(Example 8) Production of Graft Polymer of Glycidyl Butyrate-Modified Polyallylamine and Diallyl Dimethyl Ammonium Chloride Water was added to 20% by mass polyallylamine such that the concentration became 13% by mass, and glycidyl butyrate (0.1 equivalents with respect to amine) was dropwise added thereto while the solution was cooled with ice water and was stirred. After dropwise addition, the solution was allowed to react at 40° C. for 24 hours, and then was concentrated to obtain glycidyl butyrate-modified polyallylamine as an aqueous solution.

Figure 20:
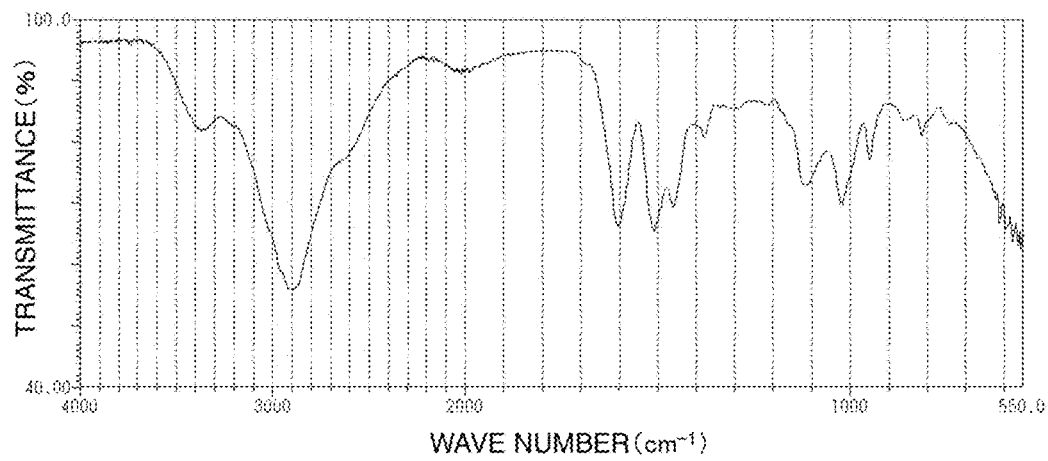
FIG. 20 illustrates an infrared spectrum of glycidyl butyrate-modified polyallylamine in an example of the present invention.

A part of the resulting solution was extracted, and 35% by mass hydrochloric acid was added thereto for neutralization to obtain an addition salt. Thereafter, reprecipitation was performed with 2-propyl alcohol, and the precipitate was filtered off and was dried at 40° C. for 24 hours in vacuum. FIG. 20 illustrates an infrared spectrum of the resulting white powdery solid. In IR measurement, a peak derived from a hydroxyl group was observed around 1120 cm$^{-1}$. These results support generation of glycidyl butyrate-modified polyallylamine.

Water was added to 30% by mass glycidyl butyrate-modified polyallylamine prepared according to the above method such that the concentration became 19% by mass, and the resulting solution was stirred at 20° C. The reaction solution had a pH of 12. Subsequently, each of 65% by mass diallyl dimethyl ammonium chloride (3 equivalents with respect to amine) and 14.42 g of 28.5% by mass APS aqueous solution (10 mol % with respect to monomer) was added thereto dividedly, and polymerization was performed for 24 hours. Thereafter, 14.42 g of 28.5% by mass APS aqueous solution (10 mol % with respect to monomer) was further added thereto dividedly to obtain a graft polymer of glycidyl butyrate-modified polyallylamine and diallyl dimethyl ammonium chloride as an aqueous solution.

Figure 21:
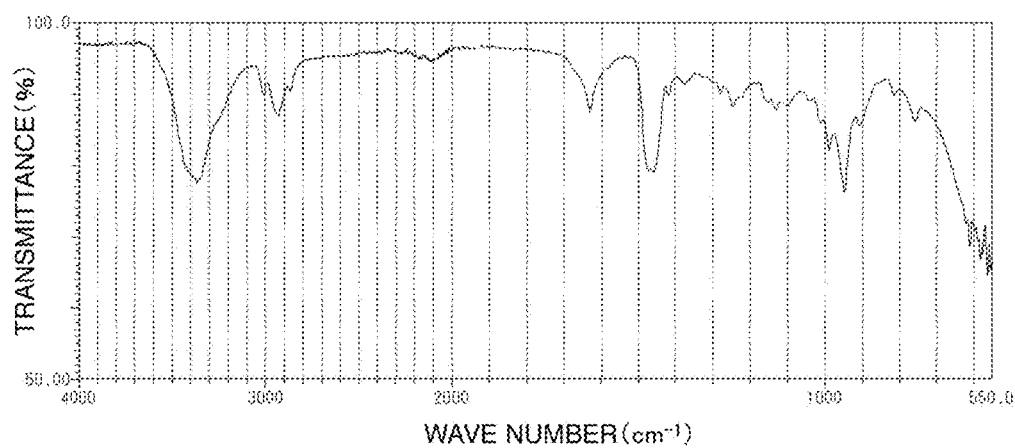
FIG. 21 illustrates an infrared spectrum of a graft polymer in an example of the present invention.

A part of the resulting solution was extracted, and was neutralized with a 25% by mass sodium hydroxide aqueous solution. Thereafter, reprecipitation was performed with ethanol, and a filtrate was collected by filtration. Thereafter, the solution was concentrated, and was dried at 40° C. for 24 hours in vacuum. The resulting pale yellow solid was dissolved in water. Thereafter, reprecipitation was performed with 2-propyl alcohol, and the precipitate was filtered off and was dried at 40° C. for 24 hours in vacuum. The resulting white powdery solid was dissolved in water. Thereafter, salicylaldehyde was added thereto, reprecipitation was performed with 2-propyl alcohol, and the precipitate was filtered off and was dried at 40° C. for 24 hours in vacuum. FIG. 21 illustrates an infrared spectrum of the resulting yellow powdery solid.

Absorption derived from a methyl group in the structure of diallyl dimethyl ammonium chloride was observed around 3010 cm$^{-1}$ in the infrared spectrum. Absorption derived from an imino group in the structure of a reaction product of glycidyl butyrate-modified polyallylamine and salicylaldehyde was observed at 1627 cm$^{-1}$. These results support generation of a graft polymer of glycidyl butyrate-modified polyallylamine and diallyl dimethyl ammonium chloride.

(Example 9) Production of Graft Polymer of Propylene Oxide-Modified Polyallylamine and Styrene Water was added to the propylene oxide-modified polyallylamine prepared in a similar manner to Example 3 such that the concentration became 20% by mass, then styrene (0.3 equivalents with respect to amine) was added thereto, and the resulting solution was stirred at 20° C. The reaction solution had a pH of 12. Thereafter, 12.53 g of 28.5% by mass SPS aqueous solution (20 mol % with respect to monomer) was added thereto, and polymerization was performed for 24 hours. Thereafter, the resulting solution was heated at 70° C. for 24 hours to obtain a graft polymer of propylene oxide-modified polyallylamine and styrene. The graft polymer had an average particle diameter of 135 nm.

Figure 22:
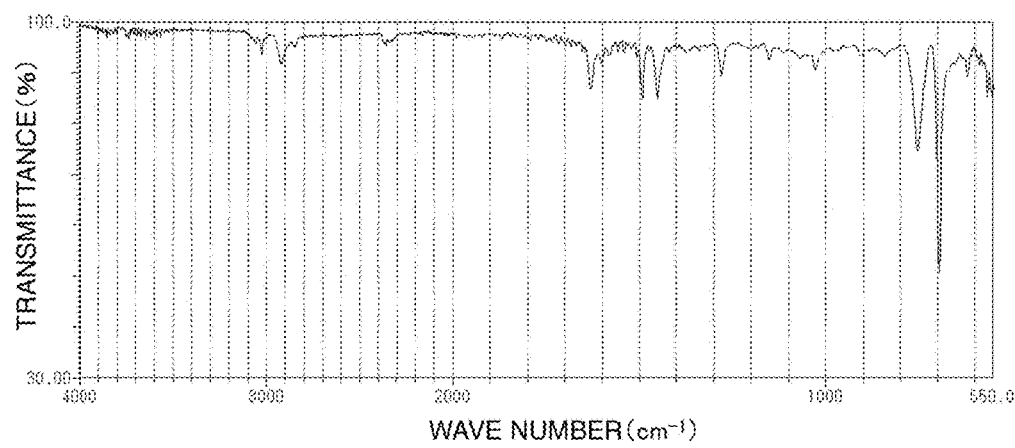
FIG. 22 illustrates an infrared spectrum of a graft polymer in an example of the present invention.

A part of the resulting milky white solution was extracted, reprecipitation was performed with tetrahydrofuran, and the precipitate was filtered off and was dried at 40° C. for 24 hours in vacuum. The resulting pale yellow solid was washed with water. Thereafter, the solid was filtered off and was dried at 40° C. for 24 hours in vacuum. The resulting white powdery solid was dispersed in water. Thereafter, salicylaldehyde was added thereto, precipitation was performed with 2-propyl alcohol, and the precipitate was filtered off and was dried at 40° C. for 24 hours in vacuum. FIG. 22 illustrates an infrared spectrum of the resulting yellow powdery solid.

Absorption derived from an aromatic ring was observed around 696 cm$^{-1}$ in the infrared spectrum. Absorption derived from an imino group in the structure of a reaction product of propylene oxide-modified polyallylamine and salicylaldehyde was observed at 1627 cm$^{-1}$. These results support generation of a graft polymer of propylene oxide-modified polyallylamine and styrene.

(Example 10) Production of Graft Polymer of Propylene Oxide-Modified Polyallylamine and Styrene Water was added to the propylene oxide-modified polyallylamine prepared in a similar manner to Example 3 such that the concentration became 20% by mass, then styrene (0.3 equivalents with respect to amine) was added thereto, and the resulting solution was stirred at 80° C. The reaction solution had a pH of 12. Thereafter, 12.01 g of 28.5% by mass APS aqueous solution (20 mol % with respect to monomer) was dropwise added thereto, and polymerization was performed for 24 hours to obtain a graft polymer of propylene oxide-modified polyallylamine and styrene. The graft polymer had an average particle diameter of 144 nm.

Figure 23:
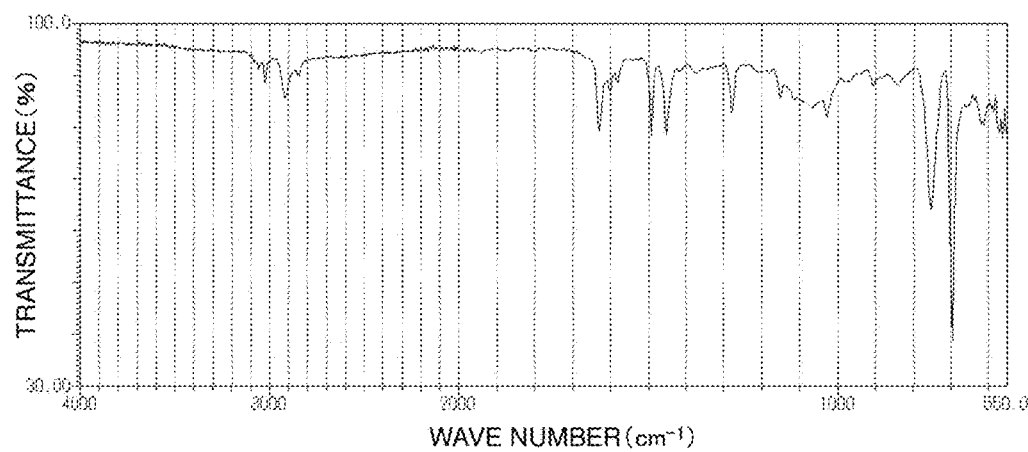
FIG. 23 illustrates an infrared spectrum of a graft polymer in an example of the present invention.

A part of the resulting milky white solution was extracted, reprecipitation was performed with tetrahydrofuran, and the precipitate was filtered off and was dried at 40° C. for 24 hours in vacuum. The resulting pale yellow solid was washed with water. Thereafter, the solid was filtered off and was dried at 40° C. for 24 hours in vacuum. The resulting white powdery solid was dispersed in water. Thereafter, salicylaldehyde was added thereto, precipitation was performed with 2-propyl alcohol, and the precipitate was filtered off and was dried at 40° C. for 24 hours in vacuum. FIG. 23 illustrates an infrared spectrum of the resulting yellow powdery solid.

Absorption derived from an aromatic ring was observed around 696 cm$^{-1}$ in the infrared spectrum. Absorption derived from an imino group in the structure of a reaction product of propylene oxide-modified polyallylamine and salicylaldehyde was observed at 1627 cm$^{-1}$. These results support generation of a graft polymer of propylene oxide-modified polyallylamine and styrene.

(Example 11) Production of Graft Polymer of Glycidol-Modified Polydiallylamine and Diallyl Dimethyl Ammonium Chloride Water was added to diallylamine such that the concentration became 79% by mass, and glycidol (1 equivalent with respect to amine) was dropwise added thereto while the solution was cooled with ice water and was stirred. After dropwise addition, the solution was allowed to react at 45° C. for 24 hours, and then was concentrated to obtain glycidol-modified diallylamine as an aqueous solution.

To 78% by mass glycidol-modified diallylamine, 35% by mass hydrochloric acid (1 equivalent with respect to amine) was added. Thereafter, water was added thereto such that the concentration became 50% by mass. The resulting solution was heated to 60° C., 2,2'-azobis(2-methyl propionamidine) dihydrochloride (6 mol % with respect to monomer) was added thereto dividedly, and polymerization was performed for 24 hours. The resulting solution was purified by electrodialysis to obtain glycidol-modified polydiallylamine as an aqueous solution.

Figure 24:
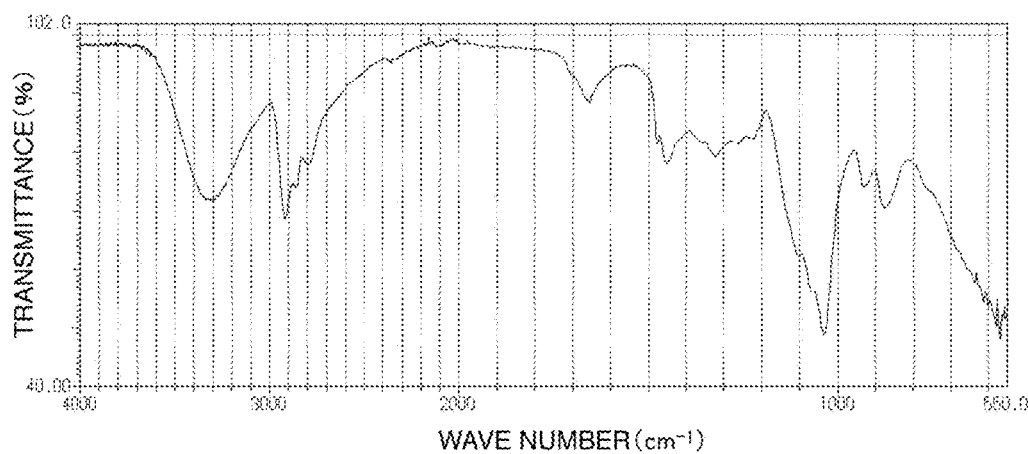
FIG. 24 illustrates an infrared spectrum of glycidol-modified polydiallylamine in an example of the present invention.

A part of the resulting solution was extracted, reprecipitation was performed with acetone, and the precipitate was filtered off and was dried at 40° C. for 24 hours in vacuum. FIG. 24 illustrates an infrared spectrum of the resulting white powdery solid. In IR measurement, a peak derived from a hydroxyl group was observed around 1035 cm$^{-1}$. These results support generation of glycidol-modified polydiallylamine.

Figure 25:
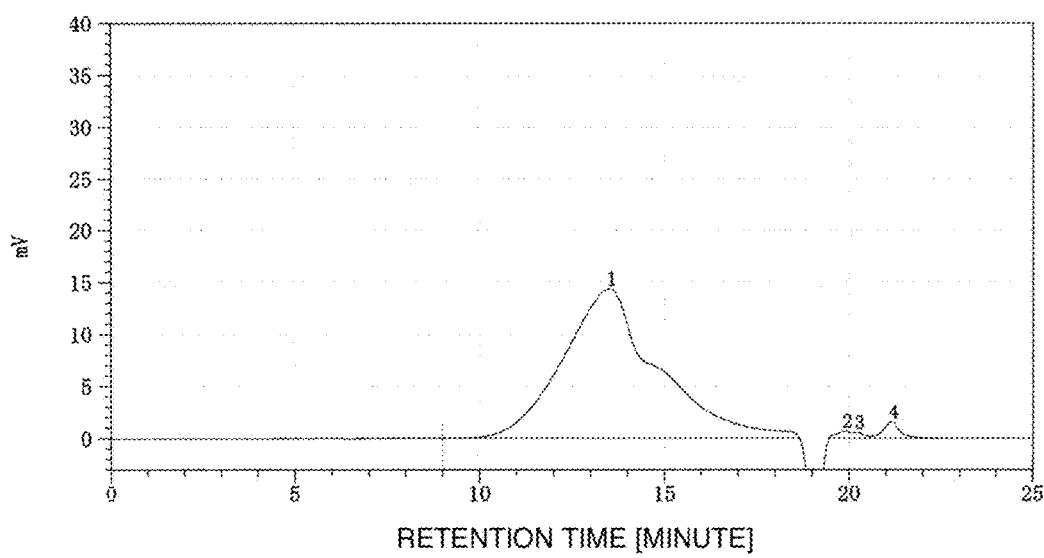
FIG. 25 illustrates a GPC chart of glycidol-modified polydiallylamine in an example of the present invention.

The weight average molecular weight by GPC measurement was 20000. FIG. 25 illustrates a GPC chart obtained in this measurement.

Water was added to 43% by mass glycidol-modified polydiallylamine prepared according to the above method such that the concentration became 30% by mass, and the resulting solution was stirred at 20° C. The reaction solution had a pH of 11. Subsequently, each of 65% by mass diallyl dimethyl ammonium chloride (3 equivalents with respect to amine) and 36.04 g of 28.5% by mass APS aqueous solution (10 mol % with respect to monomer) was added thereto dividedly, and polymerization was performed for 24 hours. Thereafter, 36.04 g of 28.5% by mass APS aqueous solution (10 mol % with respect to monomer) was further added thereto dividedly, and polymerization was performed at 50° C. for 24 hours to obtain a graft polymer of glycidol-modified polydiallylamine and diallyl dimethyl ammonium chloride as an aqueous solution.

Figure 26:
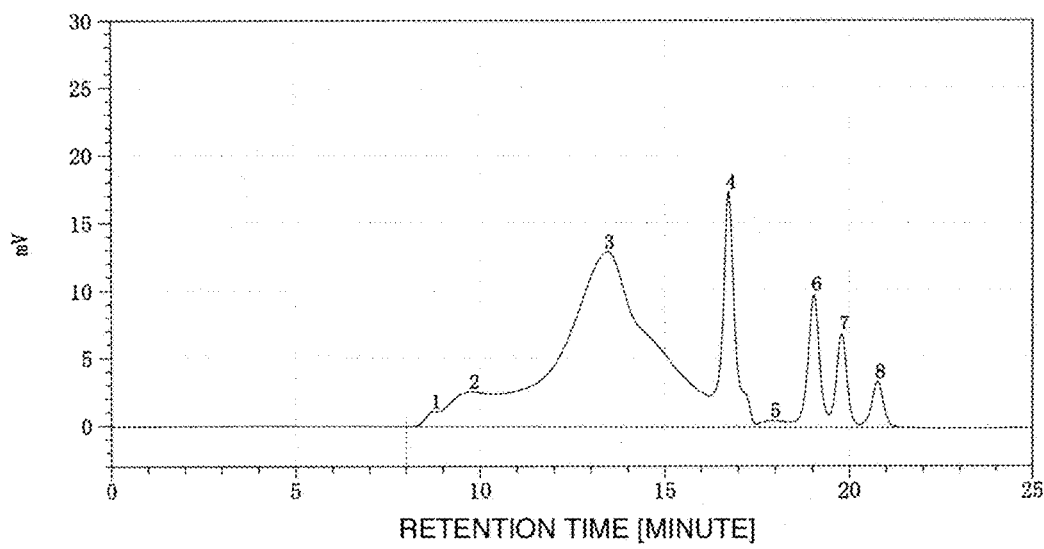
FIG. 26 illustrates a GPC chart of a graft polymer in an example of the present invention.

The weight average molecular weight by GPC measurement was 84000. FIG. 26 illustrates a GPC chart obtained in this measurement.

Figure 27:
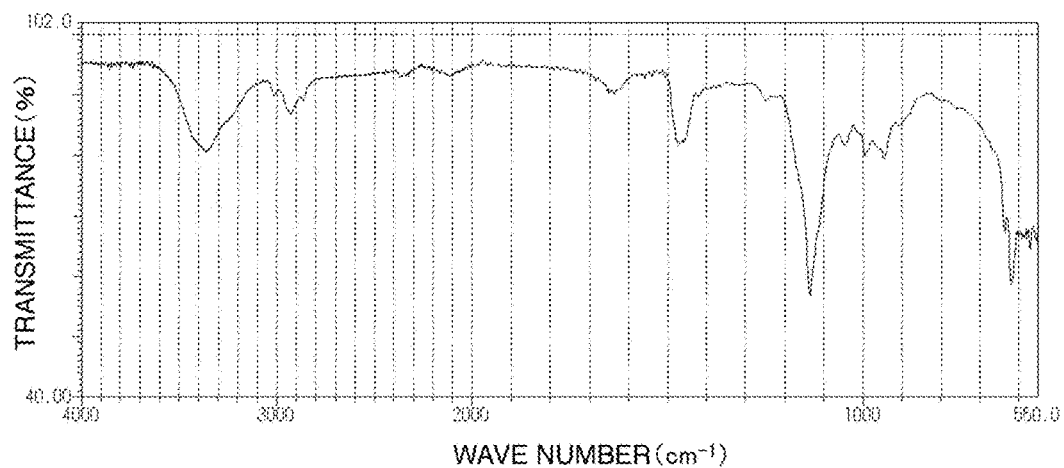
FIG. 27 illustrates an infrared spectrum of a graft polymer in an example of the present invention.

A part of the resulting solution was extracted, and was neutralized with a 25% by mass sodium hydroxide aqueous solution. Thereafter, dodecanoic acid was added thereto, reprecipitation was performed with 2-propyl alcohol, and the precipitate was filtered off and was dried at 40° C. for 24 hours in vacuum. The resulting pale yellow solid was dissolved in water. Thereafter, reprecipitation was performed with ethanol, and a filtrate was collected by filtration. Thereafter, the solution was concentrated, and was dried at 40° C. for 24 hours in vacuum. FIG. 27 illustrates an infrared spectrum of the resulting white powdery solid.

Absorption derived from a methyl group in the structure of diallyl dimethyl ammonium chloride was observed around 3010 cm$^{-1}$ in the infrared spectrum. An inflection point derived from glycidol-modified polydiallylamine was obtained around pH4 and pH9 by potentiometric titration. These results support generation of a graft polymer of glycidol-modified polydiallylamine and diallyl dimethyl ammonium chloride.

(Example 12) Production of Graft Polymer of Propylene Oxide-Modified Polyethylene Imine and Diallyl Dimethyl Ammonium Chloride Propylene oxide (0.1 equivalents with respect to amine) was dropwise added to 47% by mass polyethylene imine (weight average molecular weight: 2000) while the polyethylene imine was stirred. The resulting solution was allowed to react at 20° C. for 24 hours to obtain a propylene oxide-modified polyethylene imine aqueous solution.

Figure 28:
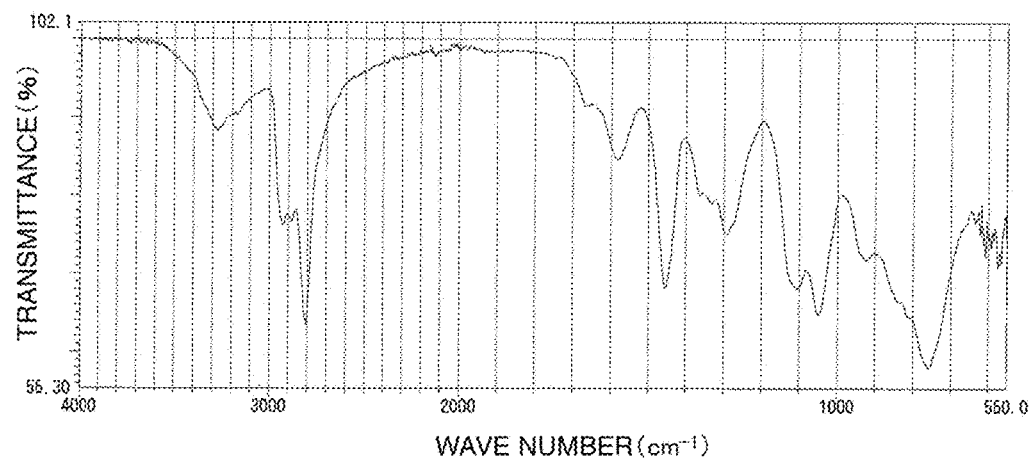
FIG. 28 illustrates an infrared spectrum of propylene oxide-modified polyethylene imine in an example of the present invention.

A part of the resulting solution was extracted, and IR measurement was performed. FIG. 28 illustrates the resulting infrared spectrum. In IR measurement, a peak derived from a methyl group was observed around 2930 cm$^{-1}$, and a peak derived from an amino group was observed around 1580 cm$^{-1}$. These results support generation of propylene oxide-modified polyethylene imine.

Water was added to 50% by mass propylene oxide-modified polyethylene imine prepared according to the above method such that the concentration became 14% by mass, and the resulting solution was stirred at 20° C. The reaction solution had a pH of 12. Subsequently, each of 65% by mass diallyl dimethyl ammonium chloride (3 equivalents with respect to amine) and 31.23 g of 28.5% by mass APS aqueous solution (10 mol % with respect to monomer) was added thereto dividedly, and polymerization was performed for 24 hours to obtain a graft polymer of propylene oxide-modified polyethylene imine and diallyl dimethyl ammonium chloride as an aqueous solution.

Figure 29:
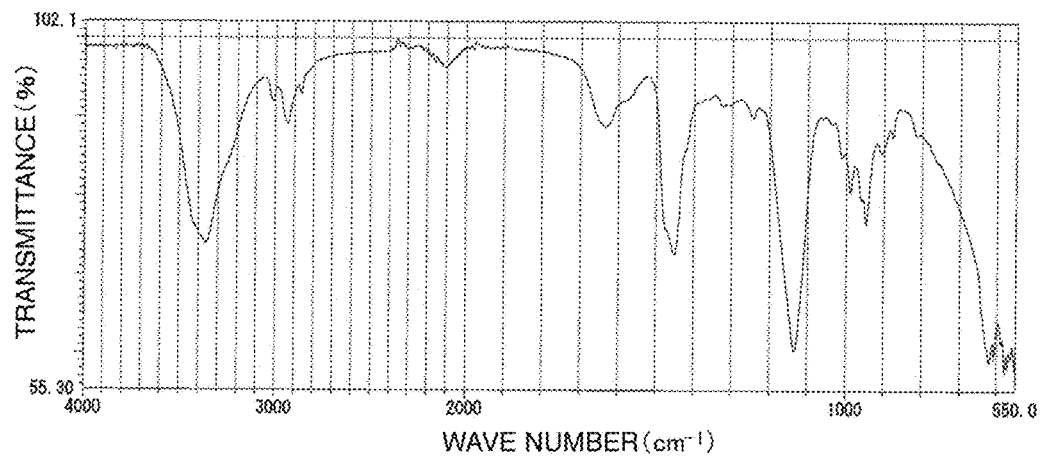
FIG. 29 illustrates an infrared spectrum of a graft polymer in an example of the present invention.

A part of the resulting solution was extracted, and was neutralized with a 25% by mass sodium hydroxide aqueous solution. Thereafter, reprecipitation was performed with ethanol, and a filtrate was collected by filtration. Thereafter, the solution was dried under reduced pressure, and was dried at 40° C. for 24 hours in vacuum. The resulting yellow solid was dissolved in water. Thereafter, reprecipitation was performed with 2-propanol, and the precipitate was filtered off and was dried at 40° C. for 24 hours in vacuum. FIG. 29 illustrates an infrared spectrum of the resulting yellow solid.

Absorption derived from a methyl group in the structure of diallyl dimethyl ammonium chloride was observed around 3010 cm$^{-1}$ in the infrared spectrum. An inflection point derived from propylene oxide-modified polyethylene imine was obtained around pH10, pH7, pH6, and pH4 by potentiometric titration. These results support generation of a graft polymer of propylene oxide-modified polyethylene imine and diallyl dimethyl ammonium chloride.

(Example 13) Production of Graft Polymer of Propylene Oxide-Modified Polyvinylamine and Diallyl Dimethyl Ammonium Chloride Propylene oxide (0.1 equivalents with respect to amine) was dropwise added to 15% by mass polyvinylamine (weight average molecular weight: 150000) while the polyvinylamine was stirred. After a reaction at 20° C. for 24 hours, the solution was concentrated to obtain a 23% by mass propylene oxide-modified polyvinylamine aqueous solution.

Figure 30:
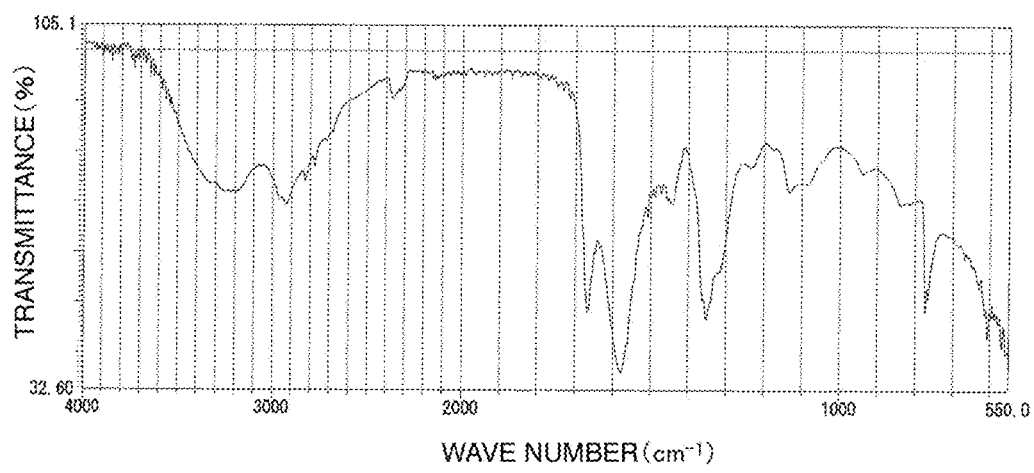
FIG. 30 illustrates an infrared spectrum of propylene oxide-modified polyvinylamine in an example of the present invention.

A part of the resulting solution was extracted, and IR measurement was performed. FIG. 30 illustrates the resulting infrared spectrum. In IR measurement, a peak derived from a methyl group was observed around 2930 cm$^{-1}$, and a peak derived from an amino group was observed around 1580 cm$^{-1}$. These results support generation of propylene oxide-modified polyvinylamine.

Water was added to 23% by mass propylene oxide-modified polyvinylamine prepared according to the above method such that the concentration became 15% by mass, and the resulting solution was stirred at 20° C. The reaction solution had a pH of 12. Subsequently, each of 65% by mass diallyl dimethyl ammonium chloride (3 equivalents with respect to amine) and 31.23 g of 28.5% by mass APS aqueous solution (10 mol % with respect to monomer) was added thereto dividedly, and polymerization was performed for 24 hours to obtain a graft polymer of propylene oxide-modified polyvinylamine and diallyl dimethyl ammonium chloride as an aqueous solution.

Figure 31:
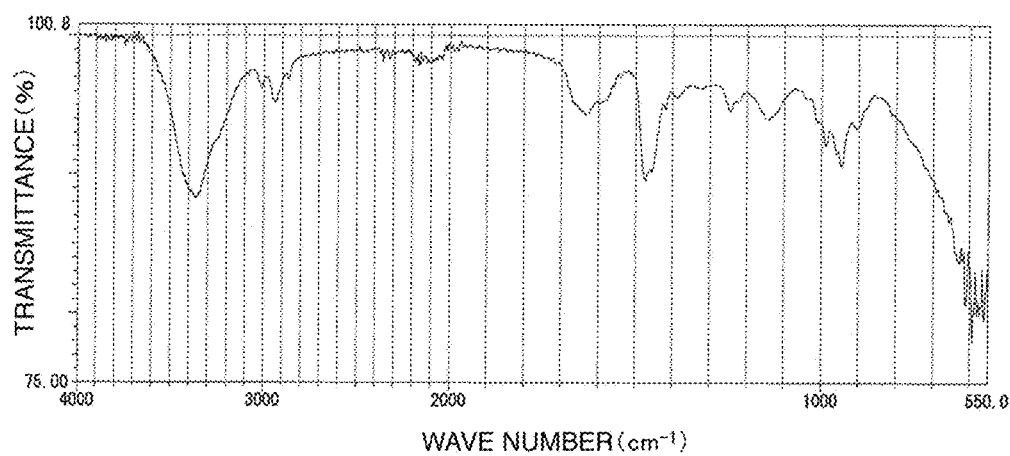
FIG. 31 illustrates an infrared spectrum of a graft polymer in an example of the present invention.

A part of the resulting solution was extracted, and was neutralized with a 25% by mass sodium hydroxide aqueous solution. Thereafter, reprecipitation was performed with ethanol, and a filtrate was collected by filtration. Thereafter, the solution was dried under reduced pressure, and was dried at 40° C. for 24 hours in vacuum. The resulting yellow solid was dissolved in water. Thereafter, reprecipitation was performed with 2-propanol, and the precipitate was filtered off and was dried at 40° C. for 24 hours in vacuum. FIG. 31 illustrates an infrared spectrum of the resulting yellow solid.

Absorption derived from a methyl group in the structure of diallyl dimethyl ammonium chloride was observed around 3010 cm$^{-1}$ in the infrared spectrum. An inflection point derived from propylene oxide-modified polyethylene imine was observed around pH7 and pH4 by potentiometric titration. These results support generation of a graft polymer of propylene oxide-modified polyvinylamine and diallyl dimethyl ammonium chloride.

(Example 14) Production of Graft Polymer of Propylene Oxide-Modified Polydiallylamine and Diallyl Dimethyl Ammonium Chloride Water was added to diallylamine such that the concentration became 78% by mass, and propylene oxide (0.1 equivalents with respect to amine) was dropwise added thereto while the solution was cooled with ice water and was stirred. The solution was allowed to react at 20° C. for 24 hours to obtain propylene oxide-modified diallylamine as an aqueous solution.

To 79% by mass propylene oxide-modified diallylamine, 35% by mass hydrochloric acid (1 equivalent with respect to amine) was added to obtain 59% by mass propylene oxide-modified diallylamine hydrochloride as an aqueous solution. Water was added to the resulting 41.33 g of 59% by mass propylene oxide-modified diallylamine hydrochloride such that the concentration became 7% by mass, and the resulting solution was heated to 60° C. Thereafter, 123.99 g of 59% by mass propylene oxide-modified diallylamine hydrochloride and 2,2'-azobis(2-methyl propionamidine) dihydrochloride (5.6 mol % with respect to monomer) were added thereto dividedly, and polymerization was performed for 24 hours. The resulting solution was purified by electrodialysis to obtain propylene oxide-modified polydiallylamine as an aqueous solution.

Figure 32:
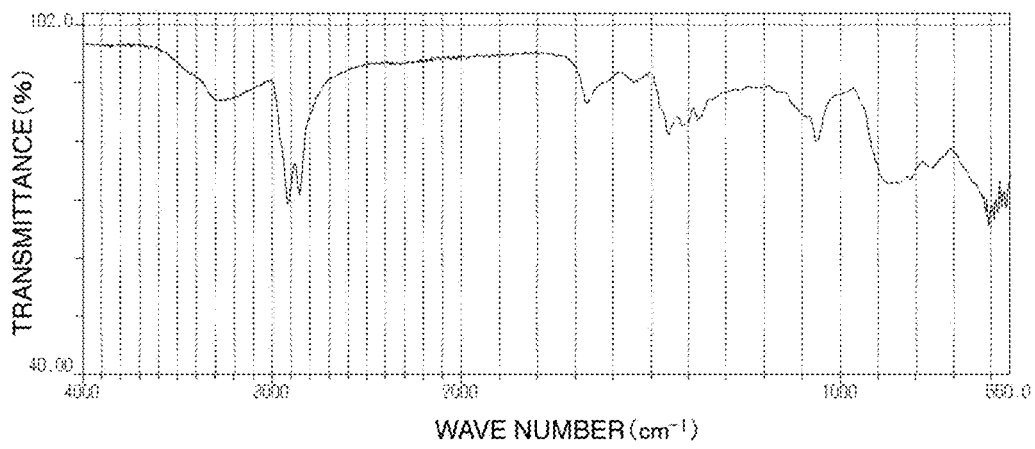
FIG. 32 illustrates an infrared spectrum of propylene oxide-modified polydiallylamine in an example of the present invention.

A part of the resulting solution was extracted, reprecipitation was performed with tetrahydrofuran, and the precipitate was filtered off and was dried at 40° C. for 24 hours in vacuum. FIG. 32 illustrates an infrared spectrum of the resulting white powdery solid. In IR measurement, a peak derived from a hydroxyl group was observed around 1060 cm$^{-1}$. These results support generation of propylene oxide-modified polydiallylamine.

Figure 33:
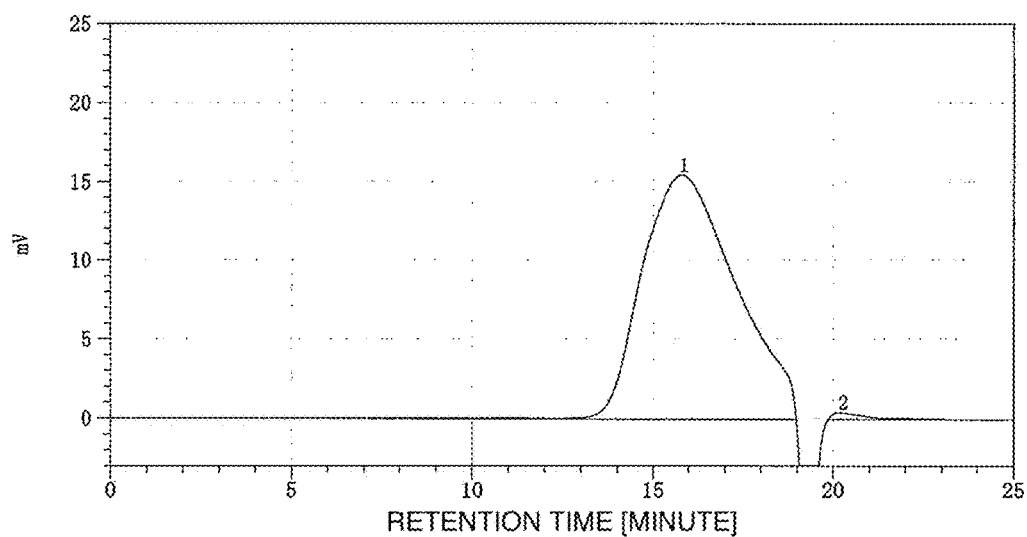
FIG. 33 illustrates a GPC chart of propylene oxide-modified polydiallylamine in the example of the present invention.

The weight average molecular weight by GPC measurement was 3000. FIG. 33 illustrates a GPC chart obtained in this measurement.

Water was added to 30% by mass propylene oxide-modified polydiallylamine prepared according to the above method such that the concentration became 24% by mass, and the resulting solution was stirred at 20° C. The reaction solution had a pH of 12. Subsequently, each of 65% by mass diallyl dimethyl ammonium chloride (3 equivalents with respect to amine) and 14.42 g of 28.5% by mass APS aqueous solution (10 mol % with respect to monomer) was added thereto dividedly, and polymerization was performed for 24 hours. Thereafter, 14.42 g of 28.5% by mass APS aqueous solution (10 mol % with respect to monomer) was further added thereto dividedly, and polymerization was performed at 60° C. for 24 hours to obtain a graft polymer of propylene oxide-modified polydiallylamine and diallyl dimethyl ammonium chloride as an aqueous solution.

Figure 34:
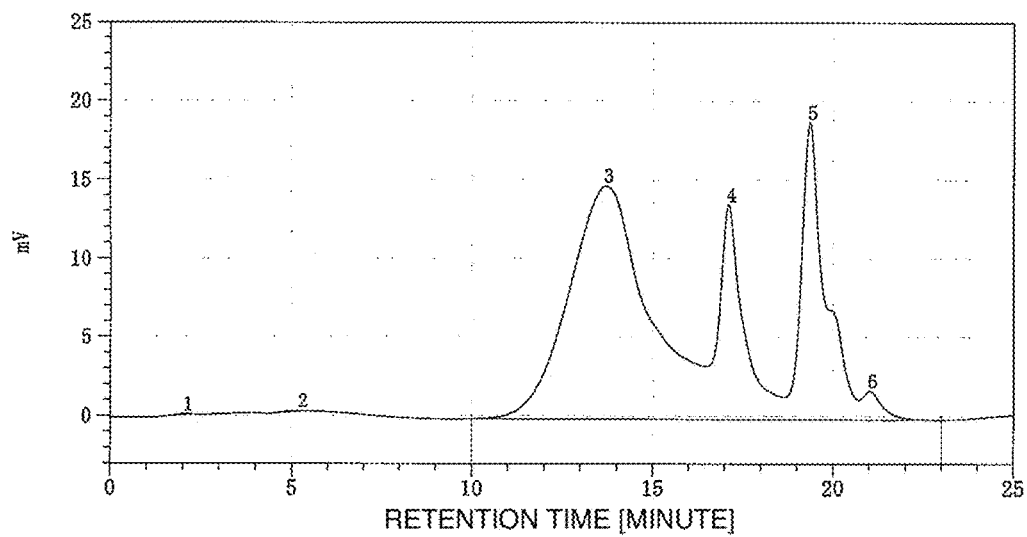
FIG. 34 illustrates a GPC chart of a graft polymer in an example of the present invention.

The weight average molecular weight by GPC measurement was 19000. FIG. 34 illustrates a GPC chart obtained in this measurement.

Figure 35:
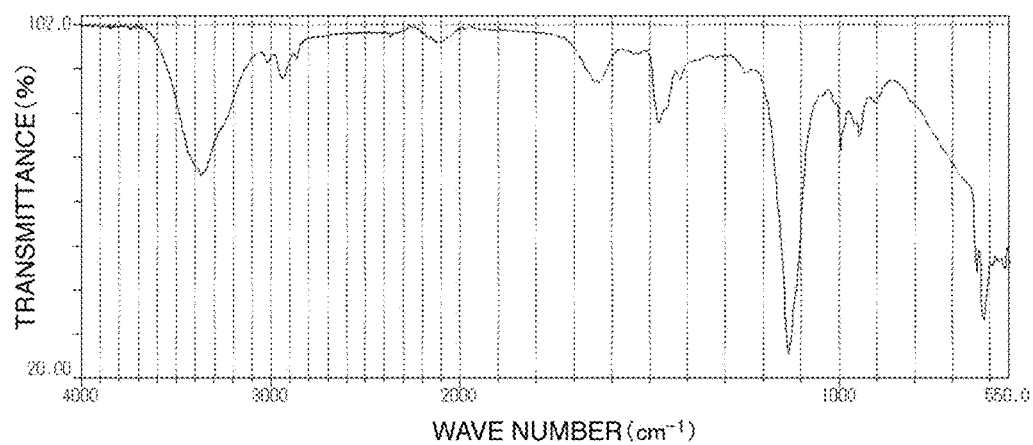
FIG. 35 illustrates an infrared spectrum of a graft polymer in an example of the present invention.

A part of the resulting solution was extracted, and was neutralized with a 25% by mass sodium hydroxide aqueous solution. Thereafter, reprecipitation was performed with ethanol, and a filtrate was collected by filtration. Thereafter, the solution was concentrated, and was dried at 40° C. for 24 hours in vacuum. The resulting pale yellow solid was dispersed in water. Thereafter, reprecipitation was performed with 2-propyl alcohol, and the precipitate was filtered off and was dried at 40° C. for 24 hours in vacuum. FIG. 35 illustrates an infrared spectrum of the resulting yellow powdery solid.

Absorption derived from a methyl group in the structure of diallyl dimethyl ammonium chloride was observed around 3010 cm$^{-1}$ in the infrared spectrum. An inflection point derived from propylene oxide-modified polydiallylamine was obtained around pH4 and pH10 by potentiometric titration. These results support generation of a graft polymer of propylene oxide-modified polydiallylamine and diallyl dimethyl ammonium chloride.

(Example 15) Production of Graft Polymer of Propylene Oxide-Modified Polyallylamine and Diallyl Dimethyl Ammonium Chloride (Weight Average Molecular Weight: 2000, Production Using Propylene Oxide-Modified Polyallylamine in which Propylene Oxide has been Added in an Amount of 0.1 Equivalents with Respect to Amine)

Propylene oxide (0.1 equivalents with respect to amine) was dropwise added to 15% by mass polyallylamine (weight average molecular weight: 1600) while the polyallylamine was cooled with ice water and was stirred. After a reaction at 20° C. for 24 hours, the solution was concentrated to obtain propylene oxide-modified polyallylamine as an aqueous solution.

Figure 36:
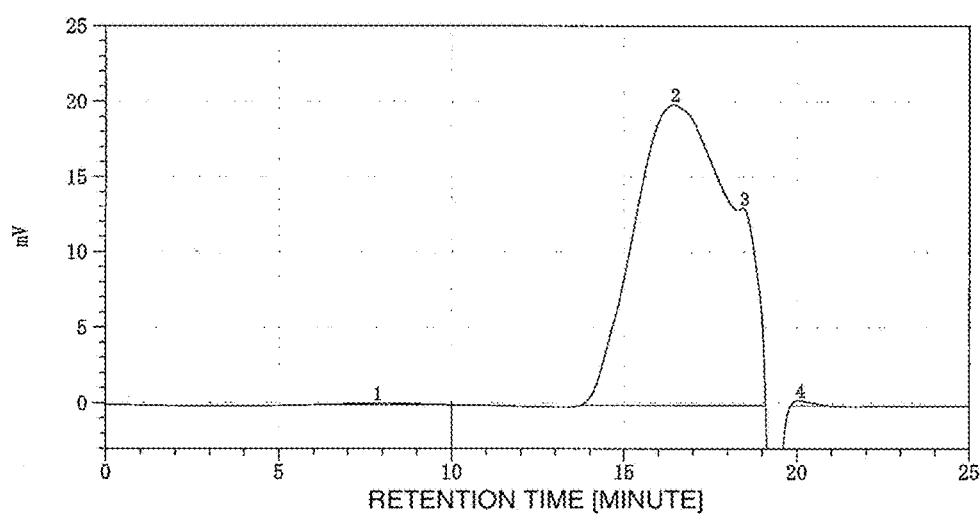
FIG. 36 illustrates a GPC chart of propylene oxide-modified polyallylamine in an example of the present invention.

The weight average molecular weight by GPC measurement was 2000. FIG. 36 illustrates a GPC chart obtained in this measurement.

Water was added to 30% by mass propylene oxide-modified polyallylamine prepared according to the above method such that the concentration became 18% by mass, and the resulting solution was stirred at 20° C. The reaction solution had a pH of 10. Subsequently, each of 65% by mass diallyl dimethyl ammonium chloride (3 equivalents with respect to amine) and 14.42 g of 28.5% by mass APS aqueous solution (10 mol % with respect to monomer) was added thereto dividedly, and polymerization was performed for 24 hours. Thereafter, 14.42 g of 28.5% by mass APS aqueous solution (10 mol % with respect to monomer) was further added thereto dividedly, and polymerization was performed at 60° C. for 24 hours to obtain a graft polymer of propylene oxide-modified polyallylamine and diallyl dimethyl ammonium chloride as an aqueous solution.

Figure 37:
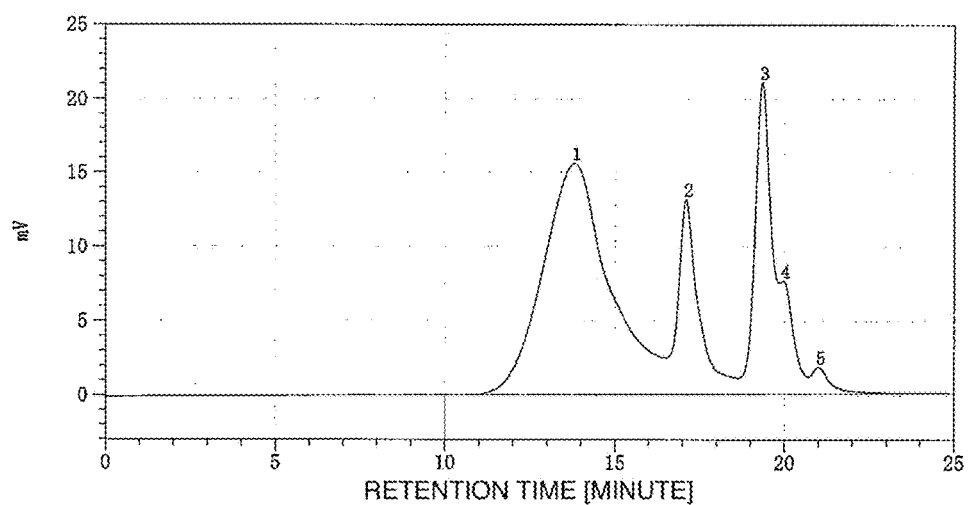
FIG. 37 illustrates a GPC chart of a graft polymer in an example of the present invention.

The weight average molecular weight by GPC measurement was 16000. FIG. 37 illustrates a GPC chart obtained in this measurement.

Figure 38:
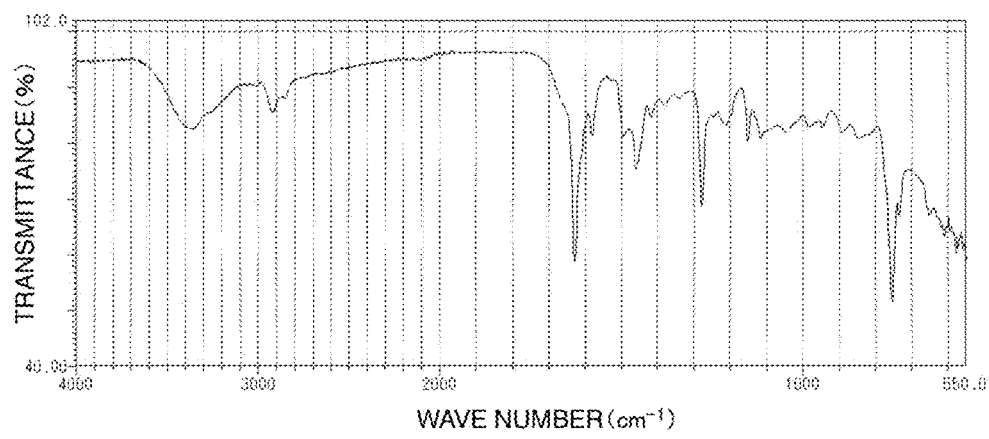
FIG. 38 illustrates an infrared spectrum of a graft polymer in an example of the present invention.

A part of the resulting solution was extracted, and was neutralized with a 25% by mass sodium hydroxide aqueous solution. Thereafter, reprecipitation was performed with ethanol, and a filtrate was collected by filtration. Thereafter, the solution was concentrated, and was dried at 40° C. for 24 hours in vacuum. The resulting pale yellow solid was dispersed in water. Thereafter, reprecipitation was performed with 2-propyl alcohol, and the precipitate was filtered off and was dried at 40° C. for 24 hours in vacuum. The resulting yellow powdery solid was dispersed in water. Thereafter, salicylaldehyde was added thereto, reprecipitation was performed with 2-propyl alcohol, and the precipitate was filtered off and was dried at 40° C. for 24 hours in vacuum. FIG. 38 illustrates an infrared spectrum of the resulting yellow powdery solid.

Absorption derived from a methyl group in the structure of diallyl dimethyl ammonium chloride was observed around 3010 cm$^{-1}$ in the infrared spectrum. Absorption derived from an imino group in the structure of a reaction product of propylene oxide-modified polyallylamine and salicylaldehyde was observed at 1627 cm$^{-1}$. These results support generation of a graft polymer of propylene oxide-modified polyallylamine and diallyl dimethyl ammonium chloride.

(Example 16) Production of Graft Polymer of Propylene Oxide-Modified Polyallylamine and 2-Vinylpyridine Water was added to propylene oxide-modified polyallylamine prepared in a similar manner to Example 3 such that the concentration became 20% by mass. Subsequently, 2-vinylpyridine (0.3 equivalents with respect to amine) was added thereto, and the resulting solution was stirred at 20° C. The reaction solution had a pH of 12. Thereafter, 12.01 g of 28.5% by mass APS aqueous solution (20 mol % with respect to monomer) was dropwise added thereto, and polymerization was performed for 24 hours to obtain a graft polymer of propylene oxide-modified polyallylamine and 2-vinylpyridine. The graft polymer had an average particle diameter of 225 nm.

From the starting materials and the like, the obtained graft polymer was estimated to have a structure of the following formula (q, r, s, t, u, and w are each independently a positive integer).

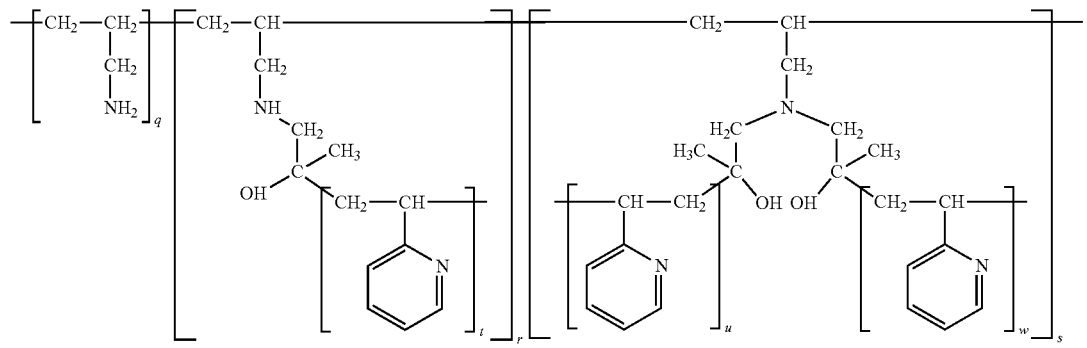

[FORMULA 54]

INDUSTRIAL APPLICABILITY

The graft polymers in the first and third inventions of the present application and methods for producing the same make it possible to produce the graft polymers safely and stably with lower introduction cost than prior art and a simple operation while maintaining characteristics of an amine, and therefore have a high utility value and high applicability in various industries.

The graft polymers in the second and fourth inventions of the present application and methods for producing the same make it possible to produce the graft polymers safely and stably by performing a reaction with lower introduction cost than prior art, a simple operation, an excellent efficiency, and excellent controllability while maintaining characteristics of an amine, and therefore have a high utility value and high applicability in various industries.

The invention claimed is:
1. A polyamine graft polymer obtained by polymerizing a polyamine derivative obtained by a reaction between (a) a polymer compound having at least one amino group and (b) a compound having at least one epoxy group; and (c) an ethylenically unsaturated monomer,
wherein the polymer compound having at least one amino group (a) is selected from the group consisting of an ethyleneimine (co)polymer having a structure represented by general formula (1), a vinylamine (co)polymer having a structure represented by general formula (2), an allylamine (co)polymer having a structure represented by general formula (3), a diallylamine (co)polymer having a structure represented by general formula (4), and an acrylic amine (co)polymer having a structure represented by general formula (5) (in the following general formulae, n is an integer of from 10 to 200000, m is an integer of from 5 to 18000, 1 is an integer of from 5 to 15000, o is an integer of from 10 to 10000, and p is an integer of from 1 to 100)

[FORMULA 1]

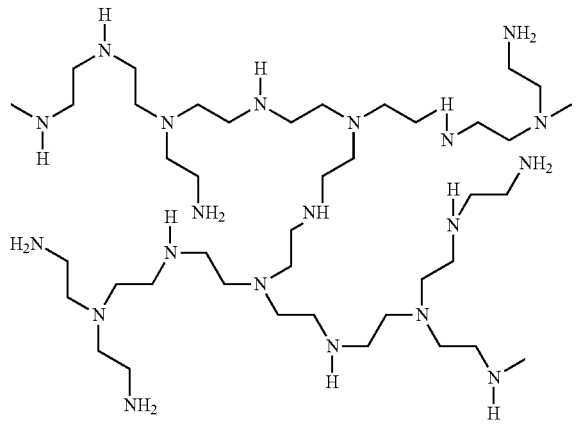

-(1)

[FORMULA 2]

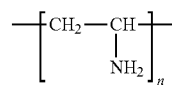

-(2)

[FORMULA 3]

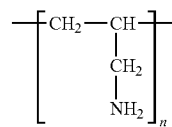

-(3)

[FORMULA 4]

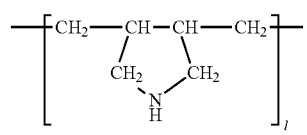

-(4)

[FORMULA 5]

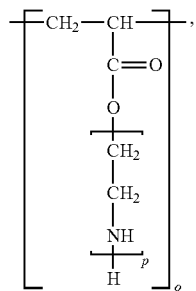

and wherein the ethylenically unsaturated monomer (c) is selected from the group consisting of a vinyl monomer, a styrene monomer, a methacrylate monomer, an acrylate monomer, an acrylamide monomer, an allyl monomer, a diallyl monomer, and an unsaturated carboxylic acid.

2. A polyamine graft polymer obtained by polymerizing a polyamine derivative obtained by polymerizing a modified allylamine monomer obtained by a reaction between (a') an allylamine monomer having at least one allyl group and at least one amino group and (b) a compound having at least one epoxy group; and (c) an ethylenically unsaturated monomer,
wherein the allylamine monomer (a') is diallylamine.

3. The polyamine graft polymer according to claim 1, wherein the compound having at least one epoxy group (b) is a compound represented by general formula (6) (R in general formula (6) is a substituted or unsubstituted by hydrocarbon group)

[FORMULA 6]

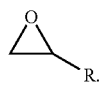

4. The polyamine graft polymer according to claim 1, wherein the compound having at least one epoxy group (b) is a compound represented by general formula (7) and selected from the group consisting of (1) ethylene oxide in which $R_1$, $R_2$, $R_3$, and $R_4$ in the formula are each a hydrogen atom, (2) an epoxy compound in which $R_1$, $R_2$, $R_3$, and $R_4$ in the formula are each independently a hydrogen atom or a linear or branched saturated hydrocarbon group having a hydroxy group in the chain and having 1 to 8 carbon atoms (not all of $R_1$, $R_2$, $R_3$, and $R_4$ are hydrogen atoms), (3) an epoxy compound in which $R_1$, $R_2$, $R_3$, and $R_4$ in the formula are each independently a hydrogen atom or a linear or branched alkyl group having 1 to 18 carbon atoms (not all of $R_1$, $R_2$, $R_3$, and $R_4$ are hydrogen atoms), (4) an epoxy compound in which $R_1$, $R_2$, $R_3$, and $R_4$ in the formula are each independently a hydrogen atom or a linear or branched saturated hydrocarbon group having an ether bond in the chain and having 1 to 8 carbon atoms (not all of $R_1$, $R_2$, $R_3$, and $R_4$ are hydrogen atoms), (5) an epoxy compound in which $R_1$, $R_2$, $R_3$, and $R_4$ in the formula are each independently a hydrogen atom or a halogen atom (not all of $R_1$, $R_2$, $R_3$, and $R_4$ are hydrogen atoms), (6) an epoxy compound in which $R_1$, $R_2$, $R_3$, and $R_4$ in the formula are each independently a hydrogen atom or an unsaturated hydrocarbon group (not all of $R_1$, $R_2$, $R_3$, and $R_4$ are hydrogen atoms), (7) an epoxy compound in which $R_1$, $R_2$, $R_3$, and $R_4$ in the formula are each independently a hydrogen atom or a hydrocarbon group containing an alicyclic hydrocarbon group or a cyclic hydrocarbon group having an unsaturated bond (not all of $R_1$, $R_2$, $R_3$, and $R_4$ are hydrogen atoms), (8) an epoxy compound in which $R_1$, $R_2$, $R_3$, and $R_4$ in the formula are each independently a hydrogen atom or a hydrocarbon group containing an aromatic ring or a heterocyclic ring (not all of $R_1$, $R_2$, $R_3$, and $R_4$ are hydrogen atoms), (9) a polyfunctional epoxy compound in which $R_1$, $R_2$, $R_3$, and $R_4$ in the formula are each independently a hydrogen atom or a hydrocarbon group containing an epoxy ring (not all of $R_1$, $R_2$, $R_3$, and $R_4$ are hydrogen atoms), (10) an epoxy compound in which $R_1$, $R_2$, $R_3$, and $R_4$ in the formula are each independently a hydrogen atom or a linear or branched saturated hydrocarbon group containing an alkoxysilyl in the chain and having 3 to 12 carbon atoms (not all of $R_1$, $R_2$, $R_3$, and $R_4$ are hydrogen atoms), (11) an epoxy compound in which $R_1$, $R_2$, $R_3$, and $R_4$ in the formula are each independently a hydrogen atom or a hydrocarbon group containing a fluorine atom in the chain (not all of $R_1$, $R_2$, $R_3$, and $R_4$ are hydrogen atoms), (12) an epoxy compound in which $R_1$, $R_2$, $R_3$, and $R_4$ in the formula are each independently a hydrogen atom or a hydrocarbon group containing a carboxyl group in the chain (not all of $R_1$, $R_2$, $R_3$, and $R_4$ are hydrogen atoms), (13) an epoxy compound in which $R_1$, $R_2$, $R_3$, and $R_4$ in the formula are each independently a hydrogen atom or a linear or branched saturated hydrocarbon group containing an ester bond or an amide bond in the chain and having 1 to 12 carbon atoms (not all of $R_1$, $R_2$, $R_3$, and $R_4$ are hydrogen atoms), and (14) an epoxy compound in which $R_1$, $R_2$, $R_3$, and $R_4$ in the formula are each independently a hydrogen atom or a hydrocarbon group containing a sulfonate group in the chain (not all of $R_1$, $R_2$, $R_3$, and $R_4$ are hydrogen atoms)

[FORMULA 7]

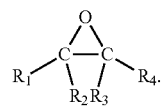

5. A method for producing a polyamine graft polymer comprising the step of adding (c) an ethylenically unsaturated monomer and a radical polymerization initiator to a polyamine derivative obtained by a reaction between (a) a polymer compound having at least one amino group and (b) a compound having at least one epoxy group to polymerize in a polar solvent,
wherein the polymer compound having at least one amino group (a) is selected from the group consisting of an ethyleneimine (co)polymer having a structure represented by general formula (1), a vinylamine (co)polymer having a structure represented by general formula (2), an allylamine (co)polymer having a structure represented by general formula (3), a diallylamine (co)polymer having a structure represented by general formula (4), and an acrylic amine (co)polymer having a structure represented by general formula (5) (in the following general formulae, n is an integer of from 10 to 200000, m is an integer of from 5 to 18000, l is an integer of from 5 to 15000, o is an integer of from 10 to 10000, and p is an integer of from 1 to 100)

[FORMULA 1]

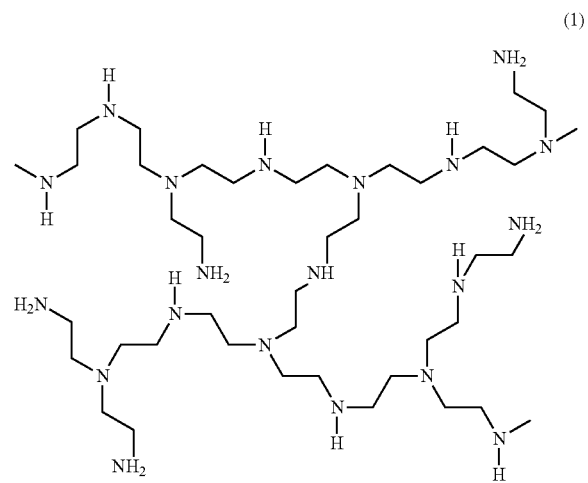
(1)

[FORMULA 2]

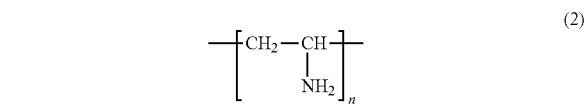
(2)

[FORMULA 3]

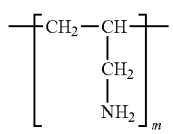
(3)

[FORMULA 4]

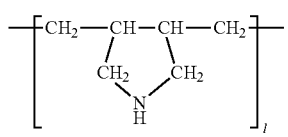
(4)

[FORMULA 5]

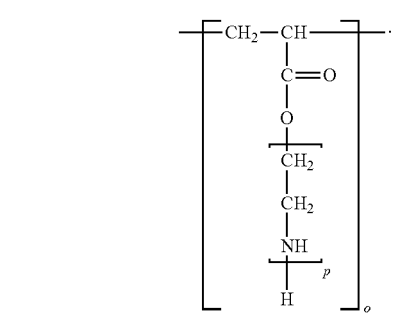
(5)

6. A method for producing a polyamine graft polymer, comprising the step of adding (c) and ethylenically unsaturated monomer and a radical polymerization initiator to a polyamine derivative obtained by polymerizing a modified allylamine monomer obtained by a reaction between (a') an allylamine monomer having at least one allyl group and at least one amino group and (b) a compound having at least one epoxy group to polymerize in a polar solvent.

7. The method for producing a polyamine graft polymer according to claim 6, wherein the allylamine monomer (a') is diallylamine.

8. The method for producing a polyamine graft polymer according to claim 5, wherein the radical polymerization initiator is selected from the group consisting of an azo initiator represented by general formula (8), a peroxide initiator represented by general formula (9), and an inorganic persulfate initiator represented by general formula (10) (in the following general formulae, $R_5$ and $R_6$ are each independently an organic group having 1 to 20 carbon atoms, $R_7$ and $R_8$ are each independently a hydrogen atom or an organic group having 1 to 20 carbon atoms, and M is an alkali metal or ammonium)

[Formula 8]

-(8)

[Formula 9]

-(9)

[Formula 10]

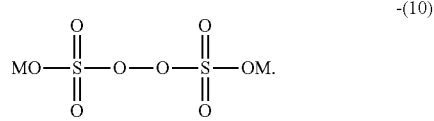
-(10)

9. The method for producing a polyamine graft polymer according to claim 5, wherein the polymerization step uses a polyamine derivative solution at a temperature of from 0 to 100° C.

10. The method for producing a polyamine graft polymer according to claim 5, wherein the polymerization step uses a polyamine derivative solution at a pH of 0 or more.

11. The method for producing a polyamine graft polymer according to claim 5, wherein the compound having at least one epoxy group (b) is a compound represented by general formula (7) and selected from the group consisting of (1) ethylene oxide in which $R_1$, $R_2$, $R_3$, and $R_4$ in the formula are each a hydrogen atom, (2) an epoxy compound in which $R_1$, $R_2$, $R_3$, and $R_4$ in the formula are each independently a hydrogen atom or a linear or branched saturated hydrocarbon group having a hydroxy group in the chain and having 1 to 8 carbon atoms (not all of $R_1$, $R_2$, $R_3$, and $R_4$ are hydrogen atoms), (3) an epoxy compound in which $R_1$, $R_2$, $R_3$, and $R_4$ in the formula are each independently a hydrogen atom or a linear or branched alkyl group having 1 to 18 carbon atoms (not all of $R_1$, $R_2$, $R_3$, and $R_4$ are hydrogen atoms), (4) an epoxy compound in which $R_1$, $R_2$, $R_3$, and $R_4$ in the formula are each independently a hydrogen atom or a linear or branched saturated hydrocarbon group having an ether bond in the chain and having 1 to 8 carbon atoms (not all of $R_1$, $R_2$, $R_3$, and $R_4$ are hydrogen atoms), (5) an epoxy compound in which $R_1$, $R_2$, $R_3$, and $R_4$ in the formula are each independently a hydrogen atom or a halogen atom (not all of $R_1$, $R_2$, $R_3$, and $R_4$ are hydrogen atoms), (6) an epoxy compound in which $R_1$, $R_2$, $R_3$, and $R_4$ in the formula are each independently a hydrogen atom or an unsaturated hydrocarbon group (not all of $R_1$, $R_2$, $R_3$, and $R_4$ are hydrogen atoms), (7) an epoxy compound in which $R_1$, $R_2$, $R_3$, and $R_4$ in the formula are each independently a hydrogen atom or a hydrocarbon group containing an alicyclic hydrocarbon group or a cyclic hydrocarbon group having an unsaturated bond (not all of $R_1$, $R_2$, $R_3$, and $R_4$ are hydrogen atoms), (8) an epoxy compound in which $R_1$, $R_2$, $R_3$, and $R_4$ in the formula are each independently a hydrogen atom or a hydrocarbon group containing an aromatic ring or a heterocyclic ring (not all of $R_1$, $R_2$, $R_3$, and $R_4$ are hydrogen atoms), (9) a polyfunctional epoxy compound in which $R_1$, $R_2$, $R_3$, and $R_4$ in the formula are each independently a hydrogen atom or a hydrocarbon group containing an epoxy ring (not all of $R_1$, $R_2$, $R_3$, and $R_4$ are hydrogen atoms), (10) an epoxy compound in which $R_1$, $R_2$, $R_3$, and $R_4$ in the formula are each independently a hydrogen atom or a linear or branched saturated hydrocarbon group containing an alkoxysilyl in the chain and having 3 to 12 carbon atoms (not all of $R_1$, $R_2$, $R_3$, and $R_4$ are hydrogen atoms), (11) an epoxy compound in which $R_1$, $R_2$, $R_3$, and $R_4$ in the formula are each independently a hydrogen atom or a hydrocarbon group containing a fluorine atom in the chain (not all of $R_1$, $R_2$, $R_3$, and $R_4$ are hydrogen atoms), (12) an epoxy compound in which $R_1$, $R_2$, $R_3$, and $R_4$ in the formula are each independently a hydrogen atom or a hydrocarbon group containing a carboxyl group in the chain (not all of $R_1$, $R_2$, $R_3$, and $R_4$ are hydrogen atoms), (13) an epoxy compound in which $R_1$, $R_2$, $R_3$, and $R_4$ in the formula are each independently a hydrogen atom or a linear or branched saturated hydrocarbon group containing an ester bond or an amide bond in the chain and having 1 to 12 carbon atoms (not all of $R_1$, $R_2$, $R_3$, and $R_4$ are hydrogen atoms), and (14) an epoxy compound in which $R_1$, $R_2$, $R_3$, and $R_4$ in the formula are each independently a hydrogen atom or a hydrocarbon group containing a sulfonate group in the chain (not all of $R_1$, $R_2$, $R_3$, and $R_4$ are hydrogen atoms)

[FORMULA 7]

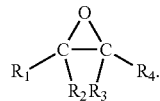

-(7)

12. The polyamine graft polymer according to claim 2, wherein the compound having at least one epoxy group (b) is a compound represented by general formula (6) (R in general formula (6) is a substituted or unsubstituted hydrocarbon group)

[FORMULA 6]

-(6)

13. The polyamine graft polymer according to claim 2, wherein the compound having at least one epoxy group (b) is a compound represented by general formula (7) and selected from the group consisting of (1) ethylene oxide in which $R_1$, $R_2$, $R_3$, and $R_4$ in the formula are each a hydrogen atom, (2) an epoxy compound in which $R_1$, $R_2$, $R_3$, and $R_4$ in the formula are each independently a hydrogen atom or a linear or branched saturated hydrocarbon group having a hydroxy group in the chain and having 1 to 8 carbon atoms (not all of $R_1$, $R_2$, $R_3$, and $R_4$ are hydrogen atoms), (3) an epoxy compound in which $R_1$, $R_2$, $R_3$, and $R_4$ in the formula are each independently a hydrogen atom or a linear or branched alkyl group having 1 to 18 carbon atoms (not all of $R_1$, $R_2$, $R_3$, and $R_4$ are hydrogen atoms), (4) an epoxy compound in which $R_1$, $R_2$, $R_3$, and $R_4$ in the formula are each independently a hydrogen atom or a linear or branched saturated hydrocarbon group having an ether bond in the chain and having 1 to 8 carbon atoms (not all of $R_1$, $R_2$, $R_3$, and $R_4$ are hydrogen atoms), (5) an epoxy compound in which $R_1$, $R_2$, $R_3$, and $R_4$ in the formula are each independently a hydrogen atom or a halogen atom (not all of $R_1$, $R_2$, $R_3$, and $R_4$ are hydrogen atoms), (6) an epoxy compound in which $R_1$, $R_2$, $R_3$, and $R_4$ in the formula are each independently a hydrogen atom or an unsaturated hydrocarbon group (not all of $R_1$, $R_2$, $R_3$, and $R_4$ are hydrogen atoms), (7) an epoxy compound in which $R_1$, $R_2$, $R_3$, and $R_4$ in the formula are each independently a hydrogen atom or a hydrocarbon group containing an alicyclic hydrocarbon group or a cyclic hydrocarbon group having an unsaturated bond (not all of $R_1$, $R_2$, $R_3$, and $R_4$ are hydrogen atoms), (8) an epoxy compound in which $R_1$, $R_2$, $R_3$, and $R_4$ in the formula are each independently a hydrogen atom or a hydrocarbon group containing an aromatic ring or a heterocyclic ring (not all of $R_1$, $R_2$, $R_3$, and $R_4$ are hydrogen atoms), (9) a polyfunctional epoxy compound in which $R_1$, $R_2$, $R_3$, and $R_4$ in the formula are each independently a hydrogen atom or a hydrocarbon group containing an epoxy ring (not all of $R_1$, $R_2$, $R_3$, and $R_4$ are hydrogen atoms), (10) an epoxy compound in which $R_1$, $R_2$, $R_3$, and $R_4$ in the formula are each independently a hydrogen atom or a linear or branched saturated hydrocarbon group containing an alkoxysilyl in the chain and having 3 to 12 carbon atoms (not all of $R_1$, $R_2$, $R_3$, and $R_4$ are hydrogen atoms), (11) an epoxy compound in which $R_1$, $R_2$, $R_3$, and $R_4$ in the formula are each independently a hydrogen atom or a hydrocarbon group containing a fluorine atom in the chain (not all of $R_1$, $R_2$, $R_3$, and $R_4$ are hydrogen atoms), (12) an epoxy compound in which $R_1$, $R_2$, $R_3$, and $R_4$ in the formula are each independently a hydrogen atom or a hydrocarbon group containing a carboxyl group in the chain (not all of $R_1$, $R_2$, $R_3$, and $R_4$ are hydrogen atoms), (13) an epoxy compound in which $R_1$, $R_2$, $R_3$, and $R_4$ in the formula are each independently a hydrogen atom or a linear or branched saturated hydrocarbon group containing an ester bond or an amide bond in the chain and having 1 to 12 carbon atoms (not all of $R_1$, $R_2$, $R_3$, and $R_4$ are hydrogen atoms), and (14) an epoxy compound in which $R_1$, $R_2$, $R_3$, and $R_4$ in the formula are each independently a hydrogen atom or a hydrocarbon group containing a sulfonate group in the chain (not all of $R_1$, $R_2$, $R_3$, and $R_4$ are hydrogen atoms)

[FORMULA 7]

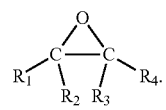

-(7)

14. The polyamine graft polymer according to claim 2, wherein the ethylenically unsaturated monomer (c) is selected from the group consisting of a vinyl monomer, a styrene monomer, a methacrylate monomer, an acrylate monomer, an acrylamide monomer, an allyl monomer, a diallyl monomer, and an unsaturated carboxylic acid.

15. The method for producing a polyamine graft polymer according to claim 6, wherein the radical polymerization initiator is selected from the group consisting of an azo initiator represented by general formula (8), a peroxide initiator represented by general formula (9), and an inorganic persulfate initiator represented by general formula (10) (in the following general formulae, $R_5$ and $R_6$ are each independently an organic group having 1 to 20 carbon atoms, $R_7$ and $R_8$ are each independently a hydrogen atom or an organic group having 1 to 20 carbon atoms, and M is an alkali metal or ammonium)

[FORMULA 8]

-(8)

[FORMULA 9]

-(9)

[FORMULA 10]

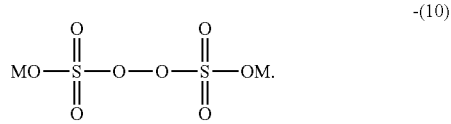
-(10)

16. The method for producing a polyamine graft polymer according to claim 6, wherein the polymerization step uses a polyamine derivative solution at a temperature of from 0 to 100° C.

17. The method for producing a polyamine graft polymer according to claim 6, wherein the polymerization step uses a polyamine derivative solution at a pH of 0 or more.

18. The method for producing a polyamine graft polymer according to claim 6, wherein the compound having at least one epoxy group (b) is a compound represented by general formula (7) and selected from the group consisting of (1) ethylene oxide in which $R_1$, $R_2$, $R_3$, and $R_4$ in the formula are each a hydrogen atom, (2) an epoxy compound in which $R_1$, $R_2$, $R_3$, and $R_4$ in the formula are each independently a hydrogen atom or a linear or branched saturated hydrocarbon group having a hydroxy group in the chain and having 1 to 8 carbon atoms (not all of $R_1$, $R_2$, $R_3$, and $R_4$ are hydrogen atoms), (3) an epoxy compound in which $R_1$, $R_2$, $R_3$, and $R_4$ in the formula are each independently a hydrogen atom or a linear or branched alkyl group having 1 to 18 carbon atoms (not all of $R_1$, $R_2$, $R_3$, and $R_4$ are hydrogen atoms), (4) an epoxy compound in which $R_1$, $R_2$, $R_3$, and $R_4$ in the formula are each independently a hydrogen atom or a linear or branched saturated hydrocarbon group having an ether bond in the chain and having 1 to 8 carbon atoms (not all of $R_1$, $R_2$, $R_3$, and $R_4$ are hydrogen atoms), (5) an epoxy compound in which $R_1$, $R_2$, $R_3$, and $R_4$ in the formula are each independently a hydrogen atom or a halogen atom (not all of $R_1$, $R_2$, $R_3$, and $R_4$ are hydrogen atoms), (6) an epoxy compound in which $R_1$, $R_2$, $R_3$, and $R_4$ in the formula are each independently a hydrogen atom or an unsaturated hydrocarbon group (not all of $R_1$, $R_2$, $R_3$, and $R_4$ are hydrogen atoms), (7) an epoxy compound in which $R_1$, $R_2$, $R_3$, and $R_4$ in the formula are each independently a hydrogen atom or a hydrocarbon group containing an alicyclic hydrocarbon group or a cyclic hydrocarbon group having an unsaturated bond (not all of $R_1$, $R_2$, $R_3$, and $R_4$ are hydrogen atoms), (8) an epoxy compound in which $R_1$, $R_2$, $R_3$, and $R_4$ in the formula are each independently a hydrogen atom or a hydrocarbon group containing an aromatic ring or a heterocyclic ring (not all of $R_1$, $R_2$, $R_3$, and $R_4$ are hydrogen atoms), (9) a polyfunctional epoxy compound in which $R_1$, $R_2$, $R_3$, and $R_4$ in the formula are each independently a hydrogen atom or a hydrocarbon group containing an epoxy ring (not all of $R_1$, $R_2$, $R_3$, and $R_4$ are hydrogen atoms), (10) an epoxy compound in which $R_1$, $R_2$, $R_3$, and $R_4$ in the formula are each independently a hydrogen atom or a linear or branched saturated hydrocarbon group containing an alkoxysilyl in the chain and having 3 to 12 carbon atoms (not all of $R_1$, $R_2$, $R_3$, and $R_4$ are hydrogen atoms), (11) an epoxy compound in which $R_1$, $R_2$, $R_3$, and $R_4$ in the formula are each independently a hydrogen atom or a hydrocarbon group containing a fluorine atom in the chain (not all of $R_1$, $R_2$, $R_3$, and $R_4$ are hydrogen atoms), (12) an epoxy compound in which $R_1$, $R_2$, $R_3$, and $R_4$ in the formula are each independently a hydrogen atom or a hydrocarbon group containing a carboxyl group in the chain (not all of $R_1$, $R_2$, $R_3$, and $R_4$ are hydrogen atoms), (13) an epoxy compound in which $R_1$, $R_2$, $R_3$, and $R_4$ in the formula are each independently a hydrogen atom or a linear or branched saturated hydrocarbon group containing an ester bond or an amide bond in the chain and having 1 to 12 carbon atoms (not all of $R_1$, $R_2$, $R_3$, and $R_4$ are hydrogen atoms), and (14) an epoxy compound in which $R_1$, $R_2$, $R_3$, and $R_4$ in the formula are each independently a hydrogen atom or a hydrocarbon group containing a sulfonate group in the chain (not all of $R_1$, $R_2$, $R_3$, and $R_4$ are hydrogen atoms)

[FORMULA 7]

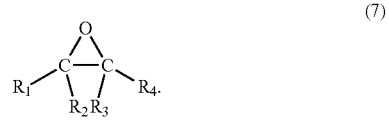
(7)

* * * * *